United States Patent
Crenshaw et al.

(10) Patent No.: US 9,554,132 B2
(45) Date of Patent: Jan. 24, 2017

(54) VIDEO COMPRESSION IMPLEMENTING RESOLUTION TRADEOFFS AND OPTIMIZATION

(75) Inventors: James E. Crenshaw, Burbank, CA (US); Alfred She, Toluca Lake, CA (US); Ning Xu, Irvine, CA (US); Limin Liu, Cupertino, CA (US); Scott Daly, Kalama, WA (US); Kevin Stec, Los Angeles, CA (US); Samir Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 417 days.

(21) Appl. No.: 14/119,090

(22) PCT Filed: May 24, 2012

(86) PCT No.: PCT/US2012/039338
§ 371 (c)(1),
(2), (4) Date: Nov. 20, 2013

(87) PCT Pub. No.: WO2012/166512
PCT Pub. Date: Dec. 6, 2012

(65) Prior Publication Data
US 2014/0098886 A1      Apr. 10, 2014

Related U.S. Application Data

(60) Provisional application No. 61/491,590, filed on May 31, 2011.

(51) Int. Cl.
H04N 7/12      (2006.01)
H04N 7/26      (2006.01)
(Continued)

(52) U.S. Cl.
CPC ...... *H04N 19/00715* (2013.01); *H04N 19/176* (2014.11); *H04N 19/182* (2014.11);
(Continued)

(58) Field of Classification Search
USPC ........................................................ 375/240
See application file for complete search history.

(56) References Cited

U.S. PATENT DOCUMENTS 5,936,669 A     8/1999 Niesen
5,978,515 A    11/1999 Katata
(Continued)

FOREIGN PATENT DOCUMENTS

EP        1725041       11/2006
JP        H01-183981    7/1989
(Continued)

OTHER PUBLICATIONS

Gupta, M et al. "Flexible Voxels for Motion-Aware Videography" Lecture Notes in Computer Science, vol. 6311, 2010, pp. 100-114.
(Continued)

*Primary Examiner* — Jeremaiah C Hallenbeck-Huber
*Assistant Examiner* — Susan E Hodges

(57) ABSTRACT

Compression transforming video into a compressed representation (which typically can be delivered at a capped pixel rate compatible with conventional video systems), including by generating spatially blended pixels and temporally blended pixels (e.g., temporally and spatially blended pixels) of the video, and determining a subset of the blended pixels for inclusion in the compressed representation including by assessing quality of reconstructed video determined from candidate sets of the blended pixels. Trade-offs may be made between temporal resolution and spatial resolution of regions of reconstructed video determined by the compressed representation to optimize perceived video quality
(Continued)

A line moving through a local 8 x 8 pixel region in four frames of a pan over a cityscape.

while reducing the data rate. The compressed data may be packed into frames. A reconstruction method generates video from a compressed representation using metadata indicative of at least one reconstruction parameter for spatial regions of the reconstructed video.

29 Claims, 9 Drawing Sheets

(51) Int. Cl.
| | |
|---|---|
| H04N 11/02 | (2006.01) |
| H04N 7/01 | (2006.01) |
| H04N 11/04 | (2006.01) |
| H04B 1/66 | (2006.01) |
| G06K 9/36 | (2006.01) |
| H04N 19/51 | (2014.01) |
| H04N 19/176 | (2014.01) |
| H04N 19/46 | (2014.01) |
| H04N 19/182 | (2014.01) |
| H04N 19/33 | (2014.01) |
| H04N 19/31 | (2014.01) |
| H04N 19/587 | (2014.01) |
| H04N 19/59 | (2014.01) |
| H04N 19/196 | (2014.01) |

(52) U.S. Cl.
CPC ............ *H04N 19/31* (2014.11); *H04N 19/33* (2014.11); *H04N 19/46* (2014.11); *H04N 19/587* (2014.11); *H04N 19/59* (2014.11); *H04N 19/198* (2014.11)

(56) References Cited

U.S. PATENT DOCUMENTS

| | | | |
|---|---|---|---|
| 5,988,863 | A | 11/1999 | Demos |
| 6,005,623 | A | 12/1999 | Takahashi |
| 6,192,079 | B1 | 2/2001 | Sharma |
| 6,289,297 | B1 | 9/2001 | Bahl |
| 6,526,097 | B1 | 2/2003 | Sethuraman |
| 6,597,739 | B1 | 7/2003 | Li |
| 6,754,266 | B2 | 6/2004 | Bahl |
| 6,993,201 | B1 | 1/2006 | Haskell |
| 7,031,533 | B2 | 4/2006 | Felts |
| 7,209,519 | B2 | 4/2007 | Vetro |
| 7,330,509 | B2 | 2/2008 | Lu |
| 7,778,493 | B2 | 8/2010 | Ho |
| 7,809,207 | B2 | 10/2010 | Dumitras |
| 7,865,027 | B2 | 1/2011 | Kim |
| 2005/0232514 | A1 | 10/2005 | Chen |
| 2006/0012680 | A1 | 1/2006 | Bourge |
| 2006/0239345 | A1 | 10/2006 | Taubman |
| 2006/0274075 | A1* | 12/2006 | Yamazaki ............ H04N 19/176 345/543 |
| 2007/0147492 | A1 | 6/2007 | Marquant |
| 2007/0253594 | A1 | 11/2007 | Lu |
| 2008/0007614 | A1 | 1/2008 | Mizuhashi |
| 2008/0043832 | A1 | 2/2008 | Barkley |
| 2008/0165861 | A1 | 7/2008 | Wen |
| 2008/0204592 | A1* | 8/2008 | Jia ........................ G06T 3/4007 348/402.1 |
| 2008/0240250 | A1 | 10/2008 | Lin |
| 2008/0247462 | A1* | 10/2008 | Demos ................. H04N 19/597 375/240.03 |
| 2009/0003430 | A1 | 1/2009 | Sun |
| 2009/0110073 | A1 | 4/2009 | Wu |
| 2009/0189912 | A1 | 7/2009 | Holtman |
| 2009/0202169 | A1 | 8/2009 | Hayashi |
| 2010/0245670 | A1* | 9/2010 | Takeda ...................... G06T 3/40 348/607 |
| 2010/0259627 | A1 | 10/2010 | Trumbull |
| 2011/0001873 | A1 | 1/2011 | Doswald |
| 2011/0050991 | A1 | 3/2011 | Bellers |
| 2011/0090352 | A1* | 4/2011 | Wang ..................... G06T 5/003 348/208.6 |

FOREIGN PATENT DOCUMENTS

| | | |
|---|---|---|
| JP | 2005-198268 | 7/2005 |
| JP | 2005-198269 | 7/2005 |
| KR | 10-2006-0103461 | 9/2006 |
| KR | 10-2011-0022544 | 3/2011 |
| WO | 2005/078663 | 8/2005 |

OTHER PUBLICATIONS

Dayal, A. et al "Adaptive Frameless Rendering" Proc. SIGGRAPH 2005, Article No. 24, ACM, New York, USA.
Ben-Ezra, M. et al. "Motion-Based Motion Deblurring" IEEE Transaction on Pattern Analysis and Machine Intelligence, v. 26, No. 6, pp. 689-698, Jun. 2004.
Wong, Chih-Wah, et al "Real-Time Rate Control via Variable Frame Rate and Quantization Parameters" Advances in Multimedia Information Processing, Lectures Notes in Computer Science, vol. 3333, pp. 314-322, Nov. 30-Dec. 3, 2004.
Lai, Wei et al. "Perceptual Video Streaming by Adaptive Spatial-Temporal Scalability" Advances in Multimedia Information Processing; 5th Pacific Rim Conference on Multimedia. Lecture Notes in Computer Science vol. 3332, pp. 431-438, Nov. 30-Dec. 3, 2004. Published by Springer-Verlag, Berlin, Germany.
Liu, Shan et al. "MPEG Video Transcoding with Joint Temporal-Spatial Rate Control" Proc. of the SPIE—The International Society for Optical Engineering, vol. 4790, pp. 278-289, Jul. 8-10, 2002, Seattle, WA, USA.
Song, Hwangiun et al. "Real-Time H.263+Frame Rate Control for Low Bit Rate VBR Video" Circuits and Systems, 1999. ISCAS '99. Proc. of the 1999 IEEE International Symposium, vol. 4, p. 307, Jul. 1999.
Martins, F.C.M. et al "Joint Control of Spatial Quantization and Temporal Sampling for Very Low Bit Rate Video" Acoustics, Speech and Signal Processing, Conference Proceedings 1996 IEEE International Conference, Issue date: May 7-10, 1996, pp. 2072-2075, vol. 4.
Liu, Shan et al. "Joint Temporal-Spatial Rate Control for Adaptive Video Transcoding" ICME 2003, International Conference on Proceedings, Jul. 6-9, 2003.
Larimer, J. et al "31:3 Judder-Induced Edge Flicker at Zero Spatial Contrast" SID Symposium Digest of Technical Papers, vol. 34, Issue 1, pp. 1042-1043, May 2003.
Larimer, J et al. "41.2: Judder-Induced Edge Flicker in Moving Objects" SID Symposium Digest of Technical Papers, vol. 32, Issue 1, pp. 1094-1097, Jun. 2001.
Watkinson, J. "Motion Portrayal in Film and Television" Pixels, Pictures, and Perception: SMPTE Workshop at NAB 1995.
Kuhmuench, C. et al "Video-Scaling Algorithm Based on Human Perception for Spatio-Temporal Stimuli" Proc. of SPIE, Multimedia Computing and Networking, Dec. 22, 2000, pp. 13-24.

* cited by examiner

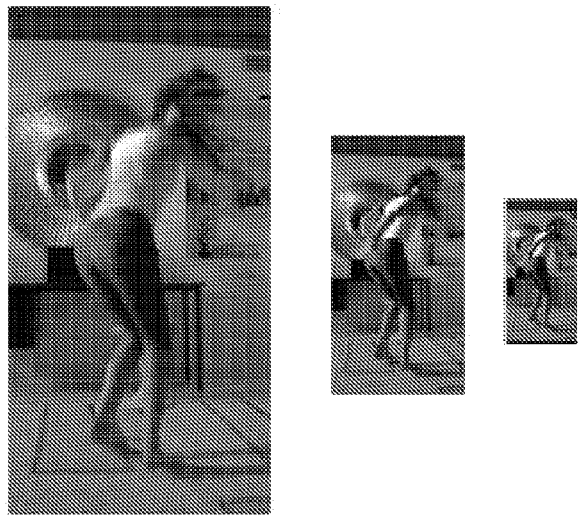

On the left, a full frame running at 30 fps.
In the middle, a quarter size image at 120 fps.
On the right, a 1/16th size image at 480 fps.
Note the motion blur evident in the 30 fps image.

FIG. 5

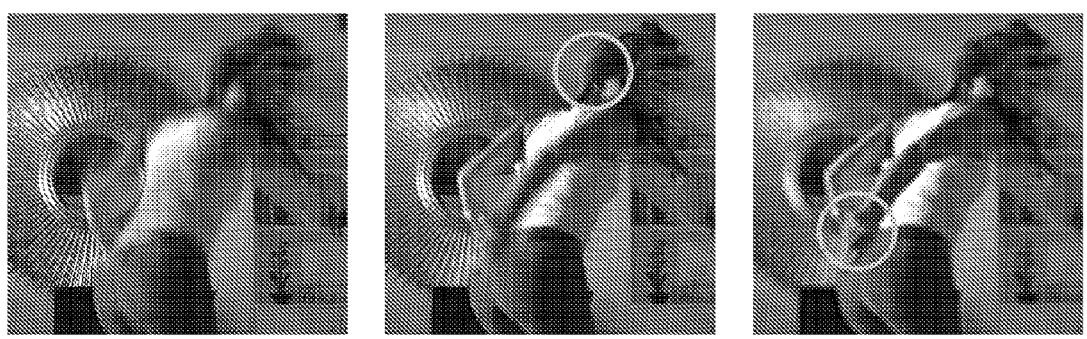

The same region from the three images of Fig 5.
The smaller images have been upsampled to get back to full display resolution. The circled areas look best in their respective images and the static background looks best at the slowest frame rate.

FIG. 6

A frame reconstructed from a packed source that included 30, 120, 240 and 480 fps regions.

Conversion Algorithm

Capture at rate $R_c$ (120, 480, etc)

Choose base frame rate $R_b$

Form pulses of length ($R_c / R_b$)

For each block in each pulse,
    assign best rate

Output converted and packed samples and "best rates" maps

Reconstruction Algorithm

For each pulse, unpack each block

For each output block at rate $R_c$ if pulse had an update,
        assign updated pixels
        upsample if needed
    else
        assign last updated pixels Smooth block borders High level pseudo-code

FIG. 9

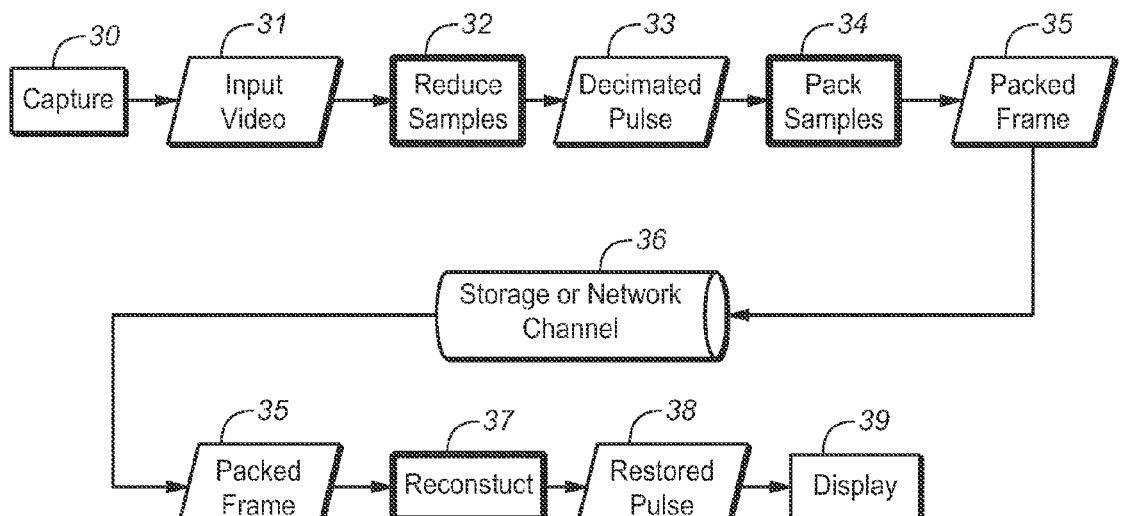

Video processing pipeline from capture to display

FIG. 10

Time-averaged pulse, at half frame rate and half spatial resolution.

Time-averaged pulse, quarter frame rate at full spatial resolution.

Reconstructing an output pulse from a packed frame

VIDEO COMPRESSION IMPLEMENTING RESOLUTION TRADEOFFS AND OPTIMIZATION

CROSS-REFERENCE TO RELATED APPLICATIONS

This application claims priority to U.S. Provisional Application No. 61/491,590 filed 31 May 2011, hereby incorporated by reference in its entirety.

BACKGROUND OF THE INVENTION

Field of the Invention

Embodiments of the invention are systems and methods for compressing input video (e.g., video data having a high frame rate) including by temporally partitioning the input video into pulses, and determining a compressed representation of each pulse including by determining for each region of a spatial partition of a frame of the pulse, a best tradeoff of temporal versus spatial resolution for the compressed representation, and systems and methods for reconstructing video for display (e.g., at the high input video frame rate) from a compressed representation of input video.

The human visual system can perceive much more than current movies and videos can present. Movie frame rates were set decades ago at levels just sufficient for the illusion of motion. Most of the constraints that necessitated such rates no longer exist. Due to limited frame rates, current video systems do not faithfully render portions of video data that contain high motion. The perception of high motion areas suffers from artifacts such as motion blur, judder, and strobing, described below.

Perceived motion blur can be caused by various sources. At the capture end, objects that move quickly enough relative to the camera's shutter duration create blur in the captured video data itself. At the display end, when an observer tracks a moving object using smooth pursuit eye movement ("SPEM") and the object moves quickly enough relative to the display's pixel-hold time, a blurred image of the object will form on the observer's retina. The trend towards larger displays occupying a larger field of view allows for high speed SPEMs, which in turn allows for more visibility of motion blur and other artifacts.

In a video that contains large amount of motion, if the frame rate is too low while the shutter angle is not large enough to sufficiently blur high motion objects, the output video will contain visually objectionable motion artifacts. "Judder" describes artifacts that occur when the frame rate is too low to adequately convey object motion, where motion is perceived as "jerky" or "discontinuous", with less smoothness or fidelity than it could ideally be perceived. In extreme cases where the motion is very high relative to the frame rate, the motion is not meaningful at all to the video observer.

On the other hand, if the frame rate is high enough to avoid such artifacts but the shutter angle (also referred to as exposure duty cycle) is small, the viewer may simultaneously perceive multiple false copies of objects or object edges. "Strobing" describes this perception, which is a common perceptual observation caused by moving objects under strobe light illumination. Strobing is caused by small shutter angles, and can occur whether the frame rate is low, moderate, or high.

The frame rate required for smooth motion perception depends on the moving region's size, speed, contrast, texture content, surround/background content, and characteristics of capture and display devices.

FIG. 1 is a simplified block diagram of a conventional video system which includes a high frame rate camera and a high frame rate TV set. The output of the camera is transmitted via cable 1 to codec 2 in which it is compressed in accordance with the standard H.264 compression (also known as "Advanced Video Coding" or "AVC" video compression) method. The compressed video output from codec 2 is transmitted via network 3 to set-top box ("STB") 4 in which it is decoded. The decoded video is transmitted via cable 5 to the high frame rate TV set for display. Cables 1 and 2 of the FIG. 1 system must transmit a great deal of uncompressed pixel information, and network 3 typically transmits a lesser amount of compressed video information.

Current video systems (e.g., the system of FIG. 1) are limited in their ability to faithfully represent a scene, especially by limited frame rates and limited overall data rates. In accordance with the present invention, decisions can be made that trade off various types of video data resolution (temporal and spatial resolutions) to optimize perceived video quality while staying within data rate constraints of modern video systems.

Current standard video frame rates cap the amount of scene motion that can be conveyed and they do so to a level below what the human visual system can perceive, particularly for large displays. Simply increasing the frame rate is typically not affordable because it would require too many pixels to be transmitted through existing interfaces (e.g. HDMI, VGA, DVI, etc) and upgrade costs are prohibitive.

Conventional video systems contain bottlenecks that prevent the user from viewing a sequence of images at a sufficiently high frame rate, and with sufficient spatial resolution, to preserve all of the perceptually relevant aspects of the original scene. The bottlenecks include:

Limited processing power in the encoding block near the video capture source. Encoders designed for 60 frame per second ("fps") input video cannot typically be configured to handle 240 fps or 480 fps input video.

Limited processing power in the decoding block (e.g., an H.264 decoder in a set-top box). Similar to limitations of the encoding bottleneck, current decoding solutions do not scale to decode video at higher frame rates such as 240 fps and beyond.

Limited data rate in the data path between the camera and the encoding block, and the data path between the set-top box (STB) and the display.

To upgrade such a conventional system from end to end to handle high frame rates, one could, at high expense, remove the bottlenecks by upgrading the blocks responsible for the bottlenecks, assuming the necessary upgrades exist.

A more feasible and lower cost solution (provided by typical embodiments of the present invention) is to preserve as many components of an existing video system as possible, while still allowing high frame rate video from the video source to be displayed at the high frame rate. Such a solution requires a method to reduce the data rate from the video source, and a method to increase the frame rate of the reconstructed output video that is rendered on the video display. To preserve as much of the existing pipeline as possible, and thus avoid as many bottlenecks as possible, the data reduction method and the high frame rate reconstruction method are (in some preferred embodiments of the invention) placed as far apart as possible in the pipeline (i.e., implemented as closely as possible to the respective end-points of the pipeline). This can minimize the cost of improving the video viewing experience in terms of bandwidth, processing power, and equipment upgrade costs.

On the content creation side (e.g., in a cinema post-production studio or streaming video server), typical embodiments of the present invention reduce the data rate before data is compressed or sent over a network. Depending on the application, data rate reduction using typical embodiments of the invention can occur as early as inside the camera before the data makes it out of the camera, or as late as the point just before compression occurs. For example, in cinema applications, where the video post-production process needs to maintain ultra-high video quality throughout, sample reduction would not be applied to the camera output, but rather to the output of the post-production process.

On the client side (e.g., in a movie theater, home theater, or mobile device), typical embodiments of the invention upsample the data rate at a point that is close to the display device, such as just after H.264 decoding inside an STB, or as late as inside the display device.

One method for encoding video data to generate encoded video that can be transmitted at reduced data rate is described in US Patent Application Publication No. US 2010/0259627 A1, by Trumbull, et al. ("Trumbull"). Trumbull proposes the mixing of update rates for different visual objects indicated by a single sequence of video frames. Trumbull teaches digitally combining successive frames of input video (e.g., by superimposition, or in another manner that modifies the blur perceived when the combined frame is displayed rather than the original frames) to generate encoded output video including the combined frame rather than the original frames, in order to reduce frame rate (e.g., to 24 frames per second) when no more than slow motion is detected from frame to frame of the input data. The encoded output video includes the original input video frames (which occur at a high frame rate, e.g., 120 frames per second) when faster motion is detected from frame to frame of the input video. For example, Trumbull suggests combining the first three frames in each sequence of five frames of input video (having a frame rate of 120 frames per second and indicative of slowly moving or stationary visual objects), and deleting the last two frames in each such sequence, to generate encoded video comprising the combined frames (which can be transmitted at a frame rate of 24 frames per second). Trumbull notes that the motion detection can be done on individual regions of each input video frame (e.g., to identify fast motion in one region, and slow or no motion in another region), and corresponding regions of successive input video frames can be combined or dropped (and replaced by a combination of corresponding regions of successive frames, or by multiple "copies" of a region of a first one of the frames in the sense that the region is not updated after assertion of the first one of the frames) rather than updating the regions at the original input frame rate (once per each of the input frames) to reduce transmitted data rate for the regions when no more than slow motion is detected in the regions from frame to frame. Other regions of the input video frames are updated at the original (higher) frame rate when faster motion is detected in these regions from frame to frame.

Trumbull's method involves two options: keeping the full input frame rate and reducing updates for slower moving visual objects, or encoding the input data to have a slower update rate by default and increasing the update rate for faster moving visual objects. Trumbull suggests that it is also possible to trade off spatial resolution in exchange for motion clarity, for example to reduce spatial resolution of encoded video data only in zones of encoded video frames that are indicative of fast moving objects. However, Trumbull does not describe any method for implementing such a trade of spatial resolution for motion clarity.

Typical embodiments of the present invention compress video data in a computationally efficient manner that implements trade offs between temporal resolution and spatial resolution to optimize perceived video quality (and to reduce data rate). The compressed data are typically packed into formats (e.g., packed frames) that are compatible with other portions of the end-to-end video chain including the display device that will display reconstructed frames generated from the compressed data.

Typical embodiments of video data reconstruction in accordance with the invention generated reconstructed video frames in response to such packed frames in a computationally efficient manner (typically the reconstructed frames have a higher data rate than does the compressed data). Typical embodiments of the compression and reconstruction are performed in a manner that avoids introducing artifacts (e.g., motion blur and judder), so that a user will not perceive objectionable artifacts (other than those that might be apparent upon display of the original input data itself) when input data are compressed and then reconstructed in accordance with the embodiments and the reconstructed frames are displayed.

SUMMARY OF THE INVENTION

In a class of embodiments, the invention is a compression (encoding) method which transforms input video into a compressed representation of the input video (which typically can be delivered at a capped pixel rate compatible with conventional video systems), including by temporally partitioning the input video into pulses, each of the pulses comprising at least two frames of the input video, and for each region of a spatial partition of a frame of each of the pulses, generating at least two different candidate blended pixel sets, at least one of the candidate blended pixel sets including at least one of a temporally blended pixel determined from at least two frames of the input video and a temporally and spatially blended pixel determined from at least two frames of the input video. For each region of the spatial partition for each of the pulses, one of the candidate blended pixel sets is selected for inclusion in the compressed representation by a step including assessment of quality of reconstructed video determined from the candidate blended pixel sets. Typically, the method generates the compressed representation so as to optimize perceived video quality of reconstructed video determined from the compressed representation, and implements trade offs between temporal resolution and spatial resolution of regions of such reconstructed video in an effort to optimize perceived video quality (as well as to reduce data rate). Another aspect of the invention is a reconstruction method which is matched with the compression method, and which generates output video from the compressed representation. The compression and reconstruction methods are matched in the sense that the reconstruction method requires knowledge of how the compressed representation was generated by the compression method, and uses metadata provided with (e.g., included in) the compressed representation, as well as pixel data included in the compressed representation, to generate the output video. The metadata is indicative of at least one reconstruction parameter (e.g., update rate) for each spatial region of the reconstructed video determined from the compressed representation.

In typical embodiments in this class, the inventive compression method generates compressed data in response to input video, and also includes a step of packing the compressed data into packed frames. Preferably, the packed frames have format that is compatible with other portions of an end-to-end video chain including a display device that will display reconstructed frames generated from the compressed data. Typical embodiments of the inventive reconstruction method generate reconstructed video frames in response to such packed frames. Typically the reconstructed frames have a higher data rate than does the compressed data (or the packed frames).

Rather than including in the compressed data every pixel of input video having m×n resolution at k frames per second (fps), where m, n, and k are integers (i.e., a pixel rate of m×n×k pixels per second), typical embodiments of the inventive encoding method cap the total pixel rate for the compressed data at a value less than m×n×k pixels per second, determine pulses of the input video (each "pulse" comprising S consecutive frames of the input video, where S is an integer referred to herein as the "pulse size"), and determine a compressed representation of each pulse. The determination of a compressed representation of each pulse includes a step of determining for each region of a spatial partition of a frame (of the pulse) and for the pulse's duration, T=S/k (where k is the input video frame rate, and S is the pulse size) or the duration of N frames of the pulse, where N is an integer less than S (the duration of such N frames of the pulse is sometimes referred to herein as the duration of a "fractional pulse," e.g., the duration of a half pulse where N=S/2), what is a best tradeoff of temporal pixel rate versus spatial pixel rate for the compressed representation. Typically, the compressed representation of each pulse is organized ("packed") as a packed frame, and the packed frames are output at a "base rate" from the inventive encoder, where "base rate" here denotes both the number of pulses per second determined by the inventive encoder from the input video frames and number of packed frames per second generated by the inventive encoder.

For example, if an object in a scene of the input video is still, then the compressed representation is preferably indicative of as much detail of the object as possible (spatial resolution is maximized) but does not update that detail as frequently as possible (temporal resolution can be low). On the other hand, for an object (e.g., a car) in a scene of the input video that moves rapidly across the screen, the data of the compressed representation that determines the object typically has high spatial resolution but low temporal resolution, since motion artifacts caused by low temporal resolution will be much more visually objectionable than the spatial blur that would be introduced by encoding the pixels (that determine the object) with a low spatial resolution at high temporal resolution.

It should be appreciated that video may be upsampled (spatially and/or temporally) to generate the input video that is compressed in accordance with the invention. In this case, the compressed representation generated by the inventive compression method may have a greater data rate than does the original (pre-upsampling) video. The frame rate of input video that is compressed in accordance with the invention is described herein as being higher than the base rate (the number of pulses per second determined by the inventive encoder from the input video frames) employed during the compression. It should be appreciated that this need not be so, in the following sense. Spatial and/or temporal upsampling (e.g., interpolation) could be applied to input video to generate upsampled video (having a higher data rate and a higher frame rate than does the input video), and compression in accordance with the invention could then be performed on the upsampled video. In this case, the base rate (employed to perform the compression) could be greater than the original frame rate (the frame rate, prior to the upsampling, of the original input video).

A key point that differentiates typical embodiments of the invention from conventional compression methods is attention to motion blur. For example, assume that the input video to be encoded in accordance with an embodiment of the invention has a full m×n×k pixel rate (where the integer k is a high frame rate, e.g., a frame rate at which some conventional cameras and displays are capable of operating, greater than any of the following conventional frame rates: 24, 48, 50, and 60 fps), and that the output pixel rate is capped at a predetermined value. A typical cap on output pixel rate is 1920×1080×60 fps, for embodiments that encode video for transmission over today's video systems. One embodiment of the inventive compression method sets the output pixel rate at k/4, and includes steps of determining for each region (of a partition of a frame of each pulse of the input video) whether the region would look better at the full frame rate (the full temporal update rate, k) with ¼ spatial resolution, at ½ the full frame rate with ½ spatial resolution, or at ¼ the full frame rate with full spatial resolution. When it is decided that a region looks better at a temporal update rate below k, the encoded version of the region includes a synthesized motion blur that accounts for presentation at the lower update rate.

Typical embodiments of the inventive encoding method provide two important benefits. First, for input video which has a native pixel rate higher than the (uncompressed) pixel rate budget of a video system that will transmit or store the encoded video, the inventive methods can maintain a better visual tradeoff (between spatial and temporal resolution) than existing methods. Second, by taking into account motion blur, the visual result is better than can be achieved by methods that work by eliminating redundancy alone. As an added bonus, typical embodiments of the inventive encoding and reconstruction methods are computationally lightweight and thus practical to include in any video transceiver chip or software.

Other aspects of the invention are a processor configured to perform any embodiment of the inventive compression and/or reconstruction method, an encoder configured to perform any embodiment of the inventive compression method, a video reconstruction system configured to perform any embodiment of the inventive reconstruction method, a system including such a processor and one or more of a capture subsystem for generating input video (to be compressed in accordance with the invention), a delivery subsystem configured to store and/or transmit a compressed representation (e.g., packed frames) of input video generated in accordance with the invention, and a display subsystem for displaying output video generated by reconstructing compressed video in accordance with the invention. Optionally, the delivery subsystem includes an encoder coupled and configured to further encode (e.g., compress) a compressed representation of input video (which has been generated in accordance with the invention) for storage and/or transmission, and a decoder coupled and configured to decode (e.g., decompress) the encoded output of the encoder to recover the compressed representation of input video. Embodiments of the inventive processor, encoder, and video reconstruction system are (or include) a general or special purpose processor (e.g., a digital signal processor or microprocessor implemented as an integrated circuit (chip) or chip set) which is programmed with software (or firmware) and/or otherwise configured to perform an embodiment of the inventive method. Another aspect of the invention is a computer readable medium (e.g., a disc) which stores code for programming a processor to implement any embodiment of the inventive method.

BRIEF DESCRIPTION OF THE DRAWINGS

FIG. 5 a set of three video frames generated from a 480 fps video clip. The leftmost image of FIG. 5 is a full frame of the clip. The middle image of FIG. 5 is a quarter size frame generated by replacing each two pixel by two pixel block of the leftmost image with an average of the four pixels of the block. The rightmost image of FIG. 5 is a "$1/16^{th}$ size" frame generated by replacing each four pixel by four pixel block of the leftmost image with an average of the sixteen pixels of the block.

FIG. 6 a set of three video frames, each having the same number of pixels. The leftmost image (frame) of FIG. 6 is a region of (a cropped version of) the leftmost image of FIG. 5. The middle image of FIG. 6 is a corresponding region of an upsampled version of the middle image of FIG. 5. The rightmost image of FIG. 6 is a corresponding region of an upsampled version of the rightmost image of FIG. 5.

FIG. 9 is high level pseudo-code for an embodiment of the inventive encoding method (conversion algorithm) and an embodiment of the inventive reconstruction method (algorithm).

FIG. 10 is a block diagram of an end-to-end video system, which implements encoding and reconstruction in accordance with a class of embodiments of the invention.

DESCRIPTION OF THE PREFERRED EMBODIMENTS

To appreciate features and benefits of preferred embodiments of the invention, consider a video sequence captured by a camera at a high frame rate of 240 frames per second. Suppose that it shows a camera pan across a cityscape. Looking at a local region, we might see a structure of a building pass through the region over several frames, where the structure is shown as a line that is several pixels thick. Ignoring color for now, this situation is illustrated in FIG. 2, which shows a line moving through a local 8×8 pixel region in four consecutive frames of a pan over a cityscape.

Suppose that we want to show this 240 fps video on a television. It is not possible to send 240 frames per second to existing televisions because the standards are all designed to send 60 frames per second at most. Typically, a conventional end-to-end system is designed around this limitation, and so instead of the edge clearly shown in FIG. 2, the picture actually sent through the system is an average of the four images of FIG. 2 over the time (1/60 second) spanned by them. If the camera's shutter is kept open for the full frame cycle (e.g., 360 degrees) of 1/60 second, we get the result shown in FIG. 3, which is a blurred version of the moving edge shown in FIG. 2. The shutter could be kept open for a shorter duration, but then there would be a gap in the motion before the next frame. If the resulting images are sent at 60 frames per second, the line that is apparent in FIG. 2 has a blurred appearance (as in FIG. 3) since each frame spans the same amount of time as do the four frames of FIG. 2.

Figure 1:
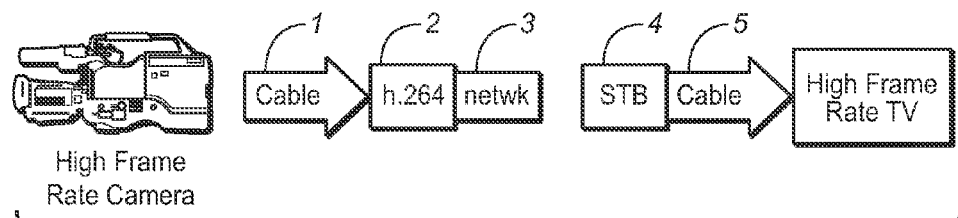
FIG. 1 is a simplified block diagram of a conventional end-to-end high frame rate video system.
Figure 2:
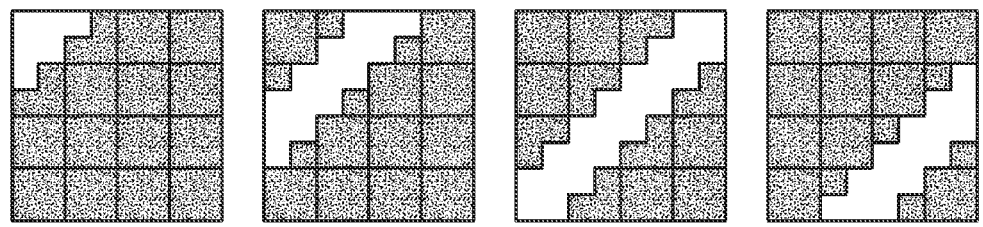
FIG. 2 is a diagram of a region of four consecutive frames of high frame rate video.
Figure 3:
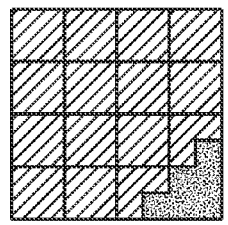
FIG. 3 is a temporally blurred region of a video frame, whose appearance is that of the four regions of FIG. 2 superimposed on each other.
Figure 4:
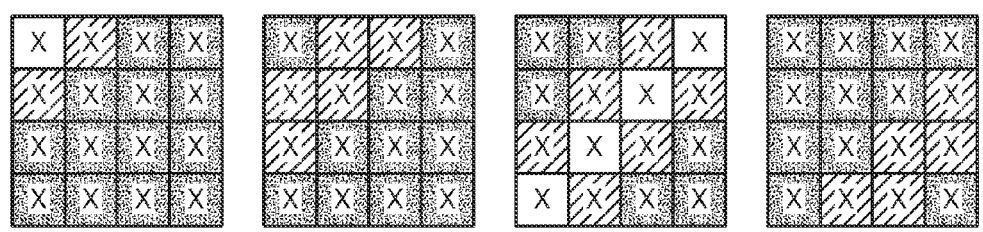
FIG. 4 is a diagram of a region of four consecutive frames of high frame rate video, each of which is a spatially blurred version of one of the regions of FIG. 2.

Another solution which allows the displayed video to show the motion that is apparent in FIG. 2 is to reduce the spatial resolution of the region and then send an update (of the spatially blurred region) once for each frame (at the rate of 240 fps). For instance, instead of 8×8=64 pixels that we send 60 times per second to match the standard frame rate, we might filter down to 4×4=16 pixels and send the resulting spatially blurred data at 240 frames per second (i.e., 3840 pixels/sec for the region). FIG. 4 shows four consecutive ones of such spatially blurred versions of the FIG. 2 images. Note that in the example of each of FIG. 3 and FIG. 4, we are sending 64 pixels every $60^{th}$ of a second—the same amount of data either way. The line motion is better preserved when the FIG. 4 data are displayed, though the line itself is blurred (relative to the FIG. 2 version).

Of course if we send spatially blurred data (as in FIG. 4) at the high (240 fps) frame rate for each full frame all of the time, although objects in motion will be less blurred, any non-moving region will have quarter spatial resolution and will appear less sharp. Typical embodiments of the invention provide an efficient way to implement a spatiotemporal tradeoff by encoding only regions of input video images (e.g., visual objects determined by frames of 240 fps input video, or other high frame rate input video) that are moving with reduced spatial resolution (and updating them at a high temporal rate, e.g., the full input video frame rate), and encoding each other region at higher spatial resolution (but updating them at a lower temporal rate).

To provide some idea of how much data might be traded off during performance of a typical embodiment of the inventive encoding method, FIG. 5 shows an example from a 480 fps video clip. If we set the data cap at 30 fps worth of pixels, it is possible to send full resolution versions of the input video frames ("full frames") at a rate of 30 fps, or four quarter size frames (each having one quarter of the spatial resolution of the full frames) at a rate of 120 fps, or sixteen "$1/16^{th}$ size" frames (each having one sixteenth of the spatial resolution of the full frames) at the full rate of 480 fps (in this example, factors of four in frame rate or total pixel count are convenient, since they correspond to changes by factors of 2 in both H (horizontal) and V (vertical) resolution. The leftmost image of FIG. 5 is one such full frame (which would be updated at the rate of 30 fps), the middle image of FIG. 5 is one such quarter size frame (which would be updated at the rate of 120 fps), and the rightmost image of FIG. 5 is one such $1/16$th size frame (which would be updated at the rate of 480 fps). Note the motion blur evident in the full frame image (the leftmost image of FIG. 5).

While it is not surprising that when we take the small amount of information in a $1/16^{th}$ size image and blow it back up to show at full resolution on a TV, the image overall looks very blurry, it is surprising that parts of that image that are moving quickly will look sharper than the same regions in the other two images.

This is apparent from FIG. 6, which shows a region of each of the images of FIG. 5, upsampled to a display size (e.g., the rightmost image of FIG. 6 is a region of the rightmost image of FIG. 5, upsampled to the display size, and the leftmost image of FIG. 6 is the corresponding region of the leftmost image of FIG. 5, upsampled to the display size). Surprisingly, each of the images of FIG. 6 has a region that retains the most detail as compared to the same region in the other images of FIG. 6. Note that the circled areas of the center and rightmost images of FIG. 6 look best in their respective images, and the static background looks best in the image with highest spatial resolution and slowest frame update rate (i.e., the leftmost image of FIG. 6). The background of the three images is not moving, and so it looks unblurred at 30 fps (in the leftmost image of FIG. 6). The hair (shown in all three images) is moving a moderate amount, and so has too much motion blur at 30 fps (in the leftmost image of FIG. 6) and too little resolution is retained at 480 fps (in the rightmost image of FIG. 6). Similarly, the hand (shown in all three images) is moving so fast that even with only $1/16^{th}$ the number of pixels, the rightmost image of FIG. 6 retains more detail at 480 fps than do the other two images of FIG. 6 (the latter two images are indicative of more pixels of the input data and higher motion blur).

In accordance with a class of embodiments of the inventive encoding method, the perceptually best rate for each region of a sequence of input video frames is determined, and encoded versions of the pixels from each region are packed into a sequence of encoded frames that contains only an optimized number of pixels. For instance, the input video may be 1920 pixel×1080 pixel progressive frames updated at 120 frames per second. One embodiment would identify the regions that look best at 120 fps but quarter spatial resolution, those that look best at 60 fps but half spatial resolution, and those that look best at 30 fps with full resolution, and encode the input pixels in each region accordingly (with different encoding for different ones of the regions), and then pack the encoded pixels into encoded frames. The total pixel rate of the encoded video is thus only 1920×1080 multiplied by 30 frames per second (one quarter of the input video frame rate), but the encoded video retains much more of the motion detail than a conventionally generated 30 fps sequence (e.g., a sequence of every fourth one of the input frames) would have.

Figure 7:
FIG. 7 is a reconstructed version of a video frame, generated by encoding a combination of the frames of FIG. 5 in accordance with an embodiment of the inventive compression method and then reconstructing the frame from the compressed representation in accordance with an embodiment of the inventive reconstruction method.

Of course a reconstruction element at the receiving end would need to unpack the encoded frames and reconstruct images for display at the correct display rate. Thus, it is necessary to signal to the reconstruction element when an image region (determined by the encoded video) has a different update rate than another image region. This can be done in several ways, including by providing a separate map with the encoded pixels, or by including special pixel values that signal changes in update rate. The reconstruction element would use such a map (or special pixel values) to know how many frame updates are supplied by the encoded data for each region. From this it can deduce spatial resolution of each region and can construct updated decoded frames using a variety of straightforward re-sampling techniques. FIG. 7 is an example of a reconstructed version of an image that has undergone encoding in accordance with such an embodiment of the inventive encoding method followed by reconstruction in accordance with an embodiment of the invention. More specifically, FIG. 7 is a reconstructed version of a video frame, generated by encoding data based on a combination of the frames of FIG. 5 in accordance with an embodiment of the inventive compression method and then reconstructing the frame from the compressed representation in accordance with an embodiment of the inventive reconstruction method (where the compressed representation is a packed frame indicative of regions updated at rates of 30, 120, 240 and 480 fps).

Although a conventional encoder that implements compression (e.g., an ordinary H.264 codec) could be used also to cap the compressed bit rate of encoded (compressed) video (a conventional H.264 codec does find and reduce temporal and spatial redundancy in input video), typical embodiments of the inventive encoding method have several advantages over conventional compression. For one, typical embodiments of the inventive encoding method generate encoded video, which when reconstructed, has quality that is directly linked to the actual motion in each region of a frame and is not influenced by the amount of action going on in other regions of the frame. For another, the cost of conventional motion estimation at an encoder, conventional motion compensation at a decoder, and frequency domain transforms at the decoder and arithmetic coding at the decoder makes such conventional techniques much more computationally expensive than in typical embodiments of the invention. Also, the complexity of conventional H.264 and other DCT-based or wavelet-based codecs do not lend themselves well to higher frame rates, as would typically be needed.

Typical embodiments of the inventive encoding method synthesize motion blurred data (in response to input video data), include at least some of the synthesized motion blurred data in the encoded output video, and evaluate metrics on the synthesized motion blurred data when deciding how to process the input data. Typical embodiments of the inventive reconstruction method recognize the synthesized motion blurred data in the encoded (compressed) data, and reconstruct the images to be displayed accordingly. Typical embodiments of the inventive method use synthesized motion blur data and reduced motion-blur data on a selective time-varying and space-varying basis to reduce the effects of strobing and judder, resulting in a net increase in the perceived quality of the reconstructed video, and implement a novel, and efficient, way of trading off spatial and temporal samples (pixels).

In contrast, typical conventional codecs take a video sequence as input and simply try to create a bit stream that can be decoded to re-create the original sequence as faithfully as possible. Thus, when the input data is indicative of a lot of motion (moving visual objects), the reconstructed images often exhibit visible artifacts, e.g., blocking artifacts or strobing.

Judder occurs (during display of video) when motion blur and the frame rate are both low relative to the amount of motion. The effect is sometimes included for artistic intent— e.g. the beach landing scene at the beginning of the movie Saving Private Ryan, or combat scenes in the movie Gladiator, but generally this is to be avoided.

Instead of re-creating exactly the full-rate sequence, typical embodiments of the inventive method synthesize the appropriate motion blur for lower frame rates, and use that as the point of comparison. The result is a better tradeoff of temporal and spatial resolution than would be achieved by sticking (in a brute force manner) to a predetermined low standardized frame rate, and the encoded data generated by such embodiments of the inventive method does not suffer from the artifacts or variability that would result if conventional methods were instead used for encoding and reconstruction of the same input video.

It should be appreciated that the decision making performed in typical embodiments of the inventive encoder could be used to drive the modes and parameters of blocks being encoded by a conventional encoder. However, depending on the nature of the original frame data and the conventional compression algorithm, the inventive algorithm may or may not pass the original frame data. In cases where the inventive algorithm does not pass original frame data, it would instead include in the encoded video either a spatially resampled version of the input video, or a synthetic temporally blurred or temporally sharpened one, or one that has had both temporal and spatial operations applied. The resampling may in some cases be accomplished as one of the operations already available in a conventional codec (for example, instead of resampling, DCT coefficients might be quantized according to the amount of information expected to be present).

Figure 8:
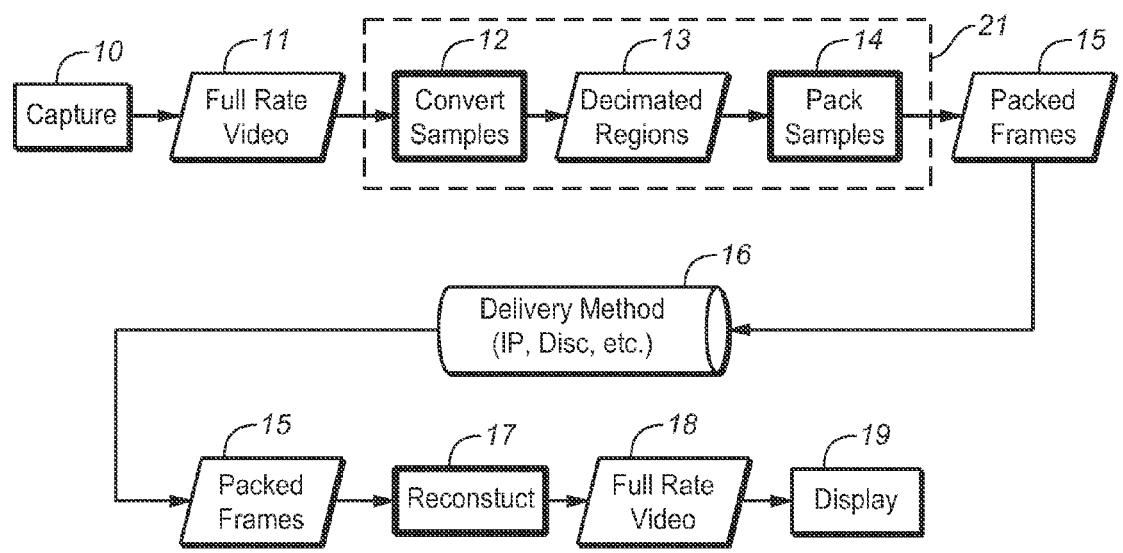
FIG. 8 is a block diagram of an end-to-end video system, which implements encoding and reconstruction in accordance with a class of embodiments of the invention.

FIG. 8 is a block diagram of an end-to-end video system, which implements encoding and reconstruction in accordance with a class of embodiments of the invention. The output of capture block 10 (e.g., a high frame rate camera) is full frame rate input video 11, which is asserted (at a first frame rate) to encoder 21 in which it is encoded (compressed) in accordance with the invention to generate packed frames 15. Packed frames 15, the compressed video output from encoder 21, are delivered (e.g., written to and read from a storage medium, and/or transmitted via a network) at a capped pixel rate via delivery element 16 to reconstruction element 17. The capped pixel rate is typically constrained by the limitation that the packed frames 15 can be delivered only at a frame rate that is less than the first frame rate. In reconstruction element 17, frames 18 are reconstructed from the packed frames. Reconstructed frames 18 are then asserted to display device 19 (e.g., a high frame rate TV set) at the first frame rate and displayed by display device 19.

Encoder 21 (implemented on the capture/production side of the video chain) includes conversion stage 12, in which sequences of the full rate video frames 11 are partitioned into pulses (and optionally the pulses are partitioned into half pulses or other fractional pulses), and compressed representation of each pulse is determined. Typically, stage 12 determines the pulses of the input video 11 such that each pulse comprises S frames of the input video, where S is an integer sometimes referred to herein as the "pulse size," and also determines multiple spatiotemporally decimated partitions of each pulse (or fractional pulse) such that each spatiotemporally decimated partition is a set of "intermediate frames." Each set of intermediate frames comprises at least one intermediate frame (e.g., frame $B_3(t_0)$ of FIG. 14, or frames $B_2(t_0)$ and $B_2(t_2)$ of FIG. 13), and each intermediate frame comprises decimated pixels (subsampled pixels of the input video). Each of the decimated pixels of each of the intermediate frames corresponds to a different a spatial region of one frame of the pulse (or fractional pulse). Typically, each of the intermediate frames for the ith spatiotemporally decimated partition comprises $M_i$ decimated pixels derived from one or more of the frames of the pulse (or fractional pulse), where $M_i$ is an integer, i is an index identifying the ith spatiotemporally decimated partition, and the index i is different for each of the spatiotemporally decimated partitions of the pulse (or fractional pulse). Each of the intermediate frames of one of the spatiotemporally decimated partitions of the pulse (or fractional pulse) has the same spatial resolution, but the intermediate frames of different ones of the spatiotemporally decimated partitions have different spatial resolutions.

Typically, stage 12 determines for each spatial region of each spatial partition of a frame (of each pulse or fractional pulse) during each time segment of duration T (where T=k(S/N), where k is the frame rate of input video 11, S is the pulse size, and N is an integer) what is a best tradeoff of temporal pixel rate versus spatial pixel rate, and accordingly selects a best set of one or more of the decimated pixels as a representation of the spatial region of the pulse (or fractional pulse). The selected decimated pixels for each pulse (or fractional pulse) determine a compressed representation of the pulse (or fractional pulse). This compressed representation, identified in FIG. 8 as a set of "decimated regions" 13, is asserted to packing stage 14. In packing stage 14, the decimated regions 13 for all the pulses (or fractional pulses) are packed to produce the packed frames 15.

In reconstruction element 17, the decimated regions 13 included in the packed frames 15 are used to reconstruct full-rate video frames 18 with an optimized tradeoff of quality given the capped pixel rate (at which packed frames 15 are delivered to element 17).

Each packed frame 15 is a set of samples (decimated regions) that represents a pulse. The samples are chosen, modified, and arranged in a way that provides robustness with respect to the delivery method. For example, if the delivery method includes the use of a lossy compression codec that tends to discards high spatial frequency information, the inventive encoder can arrange samples in the packed frame in a way that tends to introduce a lower overall amount of high spatial frequency content to reduce the effects of the lossy codec on the output video quality.

In one embodiment, packed frames 15 have the same spatial resolution as the input video frames 11, and each packed frame 15 represents video data whose local regions are each updated at a rate chosen from a fixed set of update rates (with the update rate for each local region determined by metadata included with the packed frames). In general, however, packed frames 15 are not restricted in spatial resolutions or update rate. Packed frames 15 can have any combination of static or time-varying global or local spatial resolutions, as well as any combination of static or time-varying global or local update rates.

Encoder 21 (and other embodiments of the inventive encoder) generate metadata (e.g., a resolution index map) identifying the update rate for each spatial region of the output frames determined by each packed frame 15, and include the metadata with the packed frames 15. In various embodiments, the metadata may be stored or transmitted separately with respect to packed frame data, or may be embedded in the packed frame data itself, or it may be inferred (by the reconstruction element) from packed frames.

A resolution index map is a key data component generated by typical embodiments of the inventive encoder and used by typical embodiments of the inventive reconstruction method. The map is a two-dimensional array of index values associated with a pulse. Each index value is associated with a local spatial region for the duration of the pulse, and maps to a specific pair of spatial and temporal resolution values for the region. Under sample rate constraints, the index value would indicate the best space-time tradeoff for that region.

In some embodiments, the encoding method can implement, and the resolution index map can be indicative of, trade-offs between attributes of video other than spatial resolution and temporal resolution (e.g., dynamic range and/or bit depth of a region's color or luminance). In such cases, each index value would represent an n-tuple of resolution values, corresponding to n video attributes.

The index maps (or other metadata identifying the update rate for each spatial region of the output frames determined by each packed frame) may be stored or transmitted separately with respect to packed frame data, or may be embedded in the packed frame data itself, or may be inferred from packed frames.

The inventive compression method and the inventive reconstruction method are paired in the sense that any such reconstruction method that reconstructs output frames from packed frames created in accordance with the compression method must be based on knowledge or inference on how the packed frames and resolution index map (or other metadata identifying an update rate for each spatial region of the output frames determined by each packed frame) were created.

A class of embodiments of the inventive encoding method (sometimes referred to herein as a "conversion" method or algorithm) and the inventive reconstruction method (algorithm) will be described with reference to FIG. 9. The high level pseudo-code shown in FIG. 9 for an embodiment of the inventive conversion algorithm includes the following steps:

video is captured at capture rate of $R_c$ frames per second (e.g., $R_c$=120 fps, or 480 fps);

a base rate ($R_b$) is chosen, where the expression "base rate" denotes the number of pulses per second determined from the captured input video frames asserted thereto;

the input video is then partitioned into pulses of length equal to $R_c/R_b$. For example, if $R_c$=120 fps, and the base rate is 30 fps, the pulse length is S=4 frames (of the input video);

for each region of one of the frames of each pulse, assign a best frame rate. Also, determine a block of encoded data (a block of decimated pixels) for each such region of each pulse (each block may comprise a blended version of single pixels from all the input video frames of the pulse, or a blended version of pixels from a single input video frame of the pulse, or a blended version of pixels from two or more input video frames of the pulse);

pack the blocks of decimated pixels into packed frames (identified as "converted and packed samples in FIG. 9") and output the packed frames with metadata (e.g., a "best rates" map) identifying the update rate for each block of each packed frame. The update rate for a block of a packed frame is typically equal to $R_c/X$, where X is the number of input video frames whose pixels are blended together to generate the decimated pixel(s) of the block. Each packed frame is a set of samples that represents a pulse, and the packed frames are output at the base rate.

The high level pseudo-code shown in FIG. 9 for an embodiment of the inventive reconstruction algorithm includes the following steps:

for each packed frame (each pulse of the original input video), the blocks of decimated pixels are unpacked to determine a block (or set of blocks) that corresponds to each spatial region of each output video frame;

to generate a sequence of S output video frames (having frame rate $R_c$) in response to each packed frame, for each spatial region of this output video frame sequence, a sequence of unpacked blocks (or upsampled versions of unpacked blocks) is included in the output video frame sequence. More specifically, for each spatial region of each output video frame in the sequence: if the metadata (provided with the packed frames) indicates that an update is needed, the relevant updated pixels (an updated unpacked block or updated upsampled version of an unpacked block) are included; and if the metadata indicates that no update is needed, the last (most recently) updated set of pixels for the spatial region (one of the unpacked blocks or an upsampled version thereof) is included; and optionally, the block borders (in each output video frame) are then smoothed.

Compressed video data generated in accordance with the present invention can be used to drive codecs (e.g., H.264 or MPEG-2 codecs or other conventional motion based codecs). Such conventional codecs have the ability to skip update of regions that don't change, but do not have the ability to substitute a synthetically motion-blurred region and then artificially decide to use that more than once rather than attempting to encode full detail of a plurality of frames.

More concretely, suppose there is a sequence of four input video frames indicative of rapid motion in region X. A conventional codec will allocate bits to region X in the way that comes closest to allowing recovery of all four frames. When the data rate is insufficient to allow the encoding to be faithful, the recovered images will begin to look bad, and will be increasingly worse at lower data rates. The present inventors have recognized that it is often perceptually better to encode fewer, synthetically motion blurred regions. For example, for a case where the pulse length S=4, instead of sending the "high motion" region X four times (i.e., once per each of 4 frames), a motion blur algorithm (a commonly available enabling technology) can be used in accordance with the invention to blend the four input frames down to fewer than four frames (and the blended pixels that indicate the high motion region X can be included in a compressed representation generated in accordance with the invention). The synthetic temporally blurred data is easier for a conventional codec to compress and there is less data to send. The result will often be preferable to the brute force method where every frame of the original sequence is encoded, with no synthetic motion blur added.

The input frame rate (of the input video that is compressed in accordance with the invention) is described herein as being higher than the base rate (the number of pulses per second determined by the inventive encoder from the input video frames) and fixed. It will be clear to those ordinarily skilled in the art that this need not be so, in the following sense. Spatial and/or temporal upsampling (e.g., interpolation) could be applied to input video to generate upsampled video (having a higher data rate and a higher frame rate than does the input video), and the inventive compression method could then be performed on the upsampled video. In this case, the base rate (employed to perform the compression) could be greater than the original frame rate (before the upsampling) of the original input video.

Similarly, the frame rate of the input video need not be fixed. It can be variable so long as it is sufficient to reliably interpolate intermediate motion blurred frames.

It is even possible that the input video (that is compressed in accordance with the invention) is not organized into frames or a regular pixel grid at all. Samples can be provided on some arbitrary basis in both space and time, and the inventive method can be used to generate motion blurred samples optimized for a given rate cap.

With reference to FIGS. 10-19, we next describe in more detail a class of embodiments of the invention which create a compressed representation of input video by reducing the number of samples required to represent the video, trading off spatial for temporal resolution. FIG. 10 is a block diagram of an end-to-end video system which implements encoding and reconstruction in accordance with embodiments in this class.

In the embodiments in the noted class, the inventive compression method is subject to the constraint that the number of samples that can be used to represent input video is limited to a fraction of the number of samples in the original video. That fraction is typically ¼ or ½. For example, when imposing a fraction of ¼, the output of the algorithm would represent a 240 fps input video using a sample rate that corresponds to a video whose raw frame rate is only 60 fps.

We partition the entire input video's spatiotemporal volume into local spatial regions and local temporal regions (to determine "pulses" of the input video and partitions of the pulses). Under the sample rate constraint described above, we reduce the number of samples (and/or the number of bits per sample) within each local spatiotemporal region (a region that is local in both time and space) of each pulse, using a combination of temporal decimation, spatial decimation, and bit-depth reduction.

The unit of video data that flows through the FIG. 10 pipeline is a "pulse," and FIG. 10 shows how each pulse of input data 31 is processed. The three major components of the FIG. 10 embodiment of the method are sample reduction (implemented in block 32 of FIG. 10), packing (implemented in block 34 of FIG. 10), and reconstruction of output video frames (implemented in block 37 of FIG. 10). The method processes one pulse after another until the video ends.

The sample reduction algorithm implemented by sample reduction block (or "stage") 32 decides how to represent input video 31 using fewer samples and/or fewer bits per sample than those that comprise the input video. The input video is generated in a capture operation (represented by block 30), and the compression is performed on identified subsets (input pulses) of the input video 31. Each decimated pulse representation 33 generated by block 32 is a compressed representation of a corresponding one of input pulses, which contains fewer samples and/or fewer bits per sample than does the input pulse. The algorithm seeks, for each local spatiotemporal region, the best trade-off between spatial resolution, temporal resolution, and sample bit-depth.

The pulse length can be constant for the duration of the input video and can be decided by a human or an algorithm, or can be dynamic based on various criteria such as, for example, the amount of motion in the input video or the display's maximum frame rate.

Typically, blocks 32 and 34 of FIG. 10 are implemented by a processor (e.g., an appropriately programmed general purpose computer, or digital signal processor chip or chip set, or microprocessor chip or chip set) which allocates storage space (e.g., a memory buffer in RAM) for the conversion algorithm to store one of input pulses for processing. The input pulse is formed by filling the storage space with frames of the input video 31 (e.g., frames generated by a video camera which implements capture block 30). The number of frames in the storage space equals the pulse length. Each input pulse is processed in block 32 to generate a compressed representation thereof, which is identified in FIG. 10 as decimated pulse 33. The samples comprising each decimated pulse 33 undergo packing in block 34 (using at least one resolution index map included in the compressed representation) to generate a packed frame 35 in response to each decimated pulse 33. Once an input pulse 31 is processed and the resulting packed frame 35 is sent to delivery element 36 (for storage and/or transmission, e.g., via a network channel), the storage space becomes available to be filled with the next input pulse.

When an object is in motion, a human observer in some cases is not sensitive to a loss of spatial detail or bit depth in the moving object, but is sensitive to judder, strobing, and/or motion blur. Under the sample rate constraint, in the case of a local spatial region that contains a large magnitude of motion, reducing the local spatial resolution and bit depth to "buy" a higher local temporal update rate improves the perceived quality of the local region.

On the other hand, a static/low motion area in a video does not require a high temporal update rate, in which case sacrificing a high local temporal update rate to allow for a high local spatial resolution creates a sharper area, improving the perceived quality of the local region.

A video may also contain medium-magnitude motion content, and in some cases the best perceptual quality is obtained by selecting a space/time resolution combination that is somewhere between the two extremes.

Another case may require high frame rate and high spatial resolution, but not require full bit-depth.

Sample packing block (or "stage") 34 generates a reduced-sample representation of each input video pulse, by "packing" samples of each decimated pulse 33 into formats that target flexibility and compatibility with other portions of the end-to-end video chain.

Reconstruction block (or "stage") 37 implements a reconstruction algorithm which upsamples the reduced sample representation (i.e., the samples of each packed frame 35 delivered by element 36) to generate full resolution frames needed for video playback (including display by display device 39). Block 37 outputs the full resolution frames that comprise a restored pulse 38 in response to each packed frame 35. Block 37 may be implemented by a processor (e.g., an appropriately programmed general purpose computer, or digital signal processor chip or chip set, or microprocessor chip or chip set).

We next describe the three major processing components (blocks 32, 34, and 37 of FIG. 10) in the context of an exemplary embodiment that trades off only temporal and spatial resolution, not sample bit depth.

Figure 11:
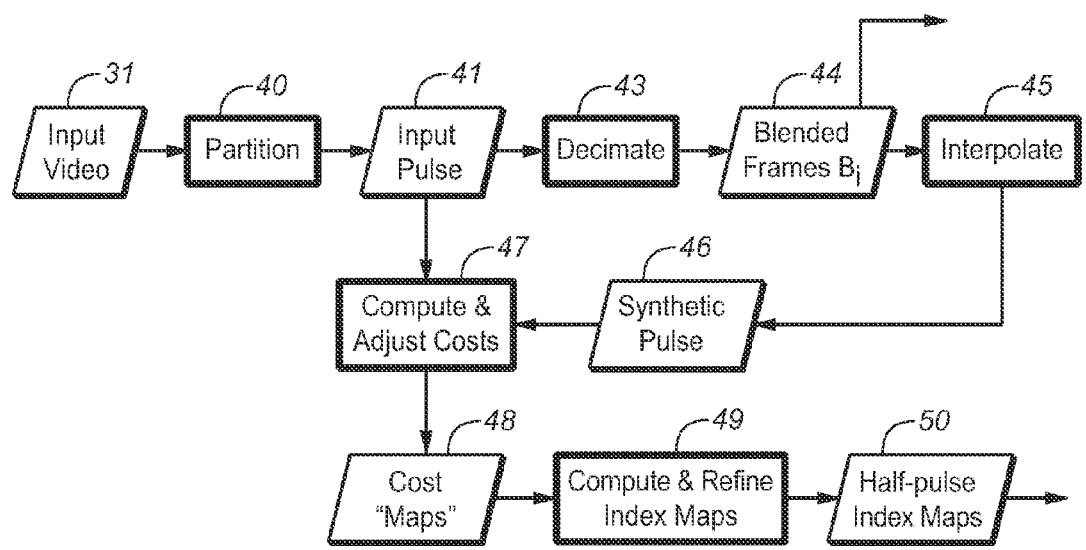
FIG. 11 is a diagram of processing steps and data flow implemented in an embodiment of sample reduction stage 32 of FIG. 10.

FIG. 11 is a diagram of processing steps and data flow implemented in an embodiment of sample reduction stage 32 of FIG. 10. In response to the input video 31 (from capture block 30), partition stage 40 of block 32 of the inventive compression method partitions the input video into pulses 41 and spatially partitions each pulse 41 (in a manner to be described below). In response to each partitioned pulse 41, decimation stage 43 generates a set of intermediate (blended) frames 44 (which is one of the outputs of the compression algorithm implemented by FIG. 11). Interpolation stage 45 performs interpolation on the frames 44 to generate a synthetic reconstructed pulse 46. Cost determination stage 47 determines a cost associated with each of a number of data subsets of frames 44 (in a manner to be described below) to determine cost maps 48. In response to cost maps 48, resolution index map computation stage 49 determines at least one resolution index map 50 (for each input pulse 41) as its output. In a preferred implementation, for pulses having even pulse length, the algorithm employs the notion of a half pulse, which is a "50/50 split" (a partition) of a pulse of the input video into an "early" half-pulse and a "late" half-pulse, partition stage 40 temporally partitions each pulse into two such half-pulses, and stage 49 generates a resolution index map 50 for each half-pulse of each input pulse 41 (i.e., two maps 50 for each input pulse 41).

The input video can be, for example, a sequence of RGB color images. In the spatiotemporal domain, one can consider the entire input video as a set of samples arranged on a regular 3-D grid in a spatiotemporal volume. In partition stage 40, the FIG. 11 embodiment of the compression algorithm divides each pulse 41 (or each half-pulse of each pulse 41) of the input video into smaller sample sets (spatial partitions of the pulse or half-pulse), each of which can be considered to have a rectangular prism shape. The length of each prism is the pulse (or half-pulse) length, in units of input video frames, and the width and depth of each prism are the horizontal and vertical size of each spatial region of a spatial partition of one frame of the pulse. The smaller sample sets are all mutually exclusive sets (i.e., there is no overlap between the small sets), and the union of the sets equals the large sample set (the pulse). Hence the small sets form a partition of the large set.

The algorithm partitions the input video samples temporally and spatially. Temporally, the input video is partitioned into pulses 41 (and optionally also into half-pulses of pulses 41). As mentioned earlier, each pulse is a fixed number of temporally contiguous frames, and the pulse length is the number of frames in a single pulse. For example, given an input video whose frames have time indices 1, 2, ..., we can choose a pulse size of 3, which gives an initial pulse of frames with indices 1, 2, and 3; the next pulse has frames with indices 4, 5, and 6, and so on.

Where "base rate" denotes the number of pulses per second, $$R_{base} = R_{orig}/L_{pulse}$$

where $R_{base}$ is the base rate, $R_{orig}$ is the frame rate of the input video 31, and $L_{pulse}$ is the pulse length. For example, for 72 fps input video, a pulse length of 3 yields a base rate of 24 pulses per second, which means the compressed representation generated by the FIG. 11 embodiment would require the same number of samples per unit time as a 24 fps input video.

Spatially, partition stage 40 partitions each pulse into "rectangular prisms." Preferably, the region size is determined by the pulse length and each region contains as many pixels as the pulse length. This design minimizes the region size, to reduce quality loss due to block artifacts. Each region is the same size. A region is a square area (n by n pixels in size) when the pulse length is a squared integer; or a rectangle for a pulse length that is not a squared integer. For example, for a pulse length of 4, the region size is 2×2 pixels; for a pulse length of 2, the region size is 1×2 (i.e., 1 row×2 columns).

The algorithm applies the following processing steps to each pulse of the input video. In typical embodiments, each pulse is processed independently, and the information from one pulse does not affect how another pulse is processed.

Stage 43 performs a set of temporal and spatial decimation operations on each pulse, using a set of decimation factors (from unity up to the pulse length, inclusive) determined from the pulse size. There may be gaps between decimation factor values.

The input pulse is decimated (in stage 43) by each of the decimation factors to form sets of intermediate frames (sometimes referred to herein as blended frames $B_i$). For temporal blending (decimation), the associated low pass filter can be a flat averaging filter, where each frame carries the same weight. This temporal blending simulates the effects of camera shutter blur, and helps reduce temporal aliasing before temporal subsampling. Temporal blending of pixels of two or more input video frames is alternatively implemented in other ways, such as by use of any of the many conventional filters that are used for performing temporal blending of video in other contexts.

For example, in a high frame rate cinema application, we may choose factors of 1, 2, 3 and decimate a 72 fps input video into sets of intermediate frames that correspond to frame rates of 72, 36, and 24 fps, or we can choose factors of 1, 1.5, 3 to yield sets of intermediate frames that correspond to 72, 48, and 24 fps. Choosing a base rate of 24 fps provides a match to cinema equipment, which is designed to handle 24 fps video, or 48 fps for 3-D cinema. Likewise, we can choose to process high frame rate video using a base rate of 30 or 60 fps for broadcast applications (or 50 fps for PAL).

To enforce the sample rate constraint, spatial decimation is applied to the intermediate frames, with the spatial decimation factor inversely proportional to the temporal decimation factor. The product of the spatial and temporal decimation factors is constant and equals the pulse length:

$$M_{time} M_{space} = L_{pulse}$$

For spatial decimation, one implementation of decimation stage 43 uses Lanczos-2 (i.e., Lanczos filter with "size" parameter a=2) as the spatial low pass filter. Alternatively, bi-linear, bi-cubic, and other interpolation filters and/or methods may be used.

Let $B_i$ denote the sets of intermediate frames after an input pulse has been subsampled in time and/or space, where i is an index associated with a specific combination of spatial and temporal decimation factors for each set. Index i will sometimes be referred to as the resolution index or just index where the context is clear. Smaller values of i are associated with higher temporal resolution; larger values of i correspond to higher spatial resolution.

Figure 12:
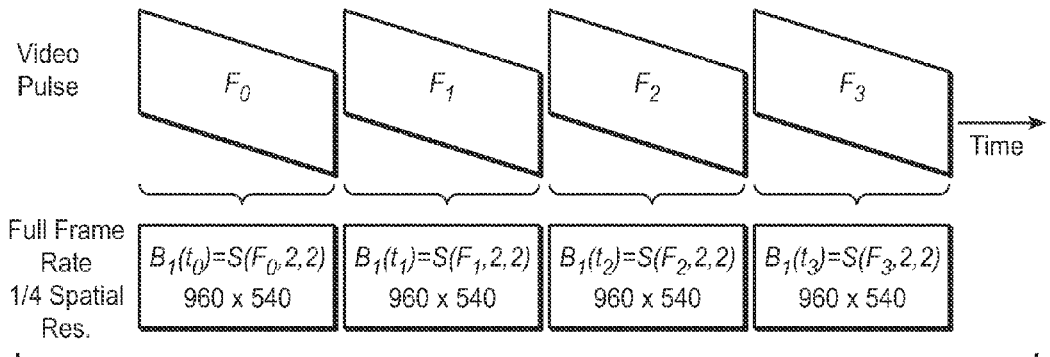
FIG. 12 is a diagram of a first set of intermediate frames ($B_1$) generated by an embodiment of sample reduction stage 32 of FIG. 10, in response to a pulse of input video data.
Figure 13:
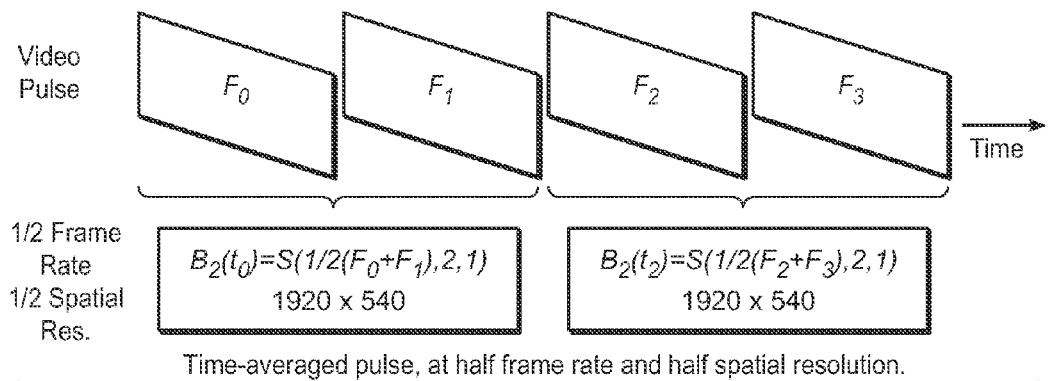
FIG. 13 is a diagram of a second set of intermediate (blended) frames ($B_2$) generated by an embodiment of sample reduction stage 32 of FIG. 10, in response to the same pulse of input video data employed to generate the intermediate frames of FIG. 12.
Figure 14:
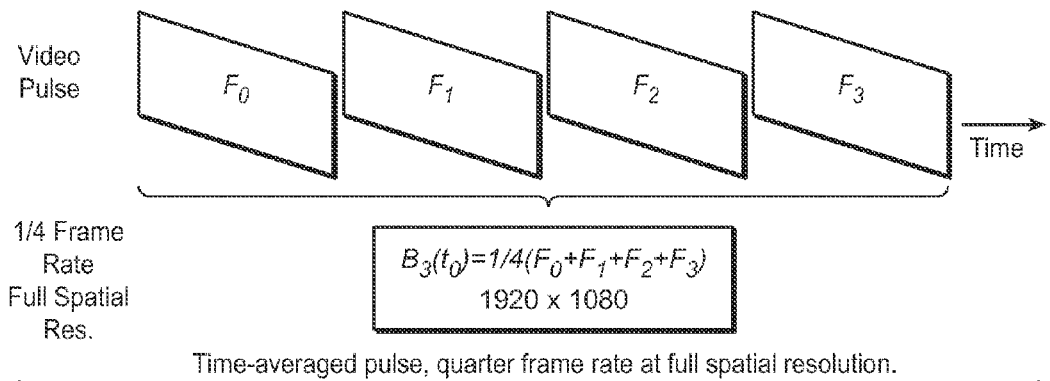
FIG. 14 is a diagram of third set of intermediate frames, comprising a single intermediate (blended) frame ($B_3$), generated by an embodiment of sample reduction stage 32 of FIG. 10, in response to the same pulse of input video data employed to generate the intermediate frames of FIG. 12.

With reference to FIGS. 12, 13, and 14, consider the following example which assumes a 240 fps input video and a sample rate budget of 60 fps (at the spatial resolution of the input video, which is 1920×1080 pixels). We choose a pulse size of 4 to generate samples that satisfy the budget. With a pulse size of 4, we can choose decimation factors of 1, 2, and 4, resulting, respectively, in three sets of intermediate frames, which can be associated with the frame rates 240, 120, and 60 fps. The frames of each input video pulse are denoted $F_0$, $F_1$, $F_2$, and $F_3$ (as indicated in FIGS. 12-14).

Decimation stage 43 generates the "240 fps" set ($B_1$) to include four intermediate frames. No temporal blending is needed for this set, but to keep the sample rate constant, each intermediate frame is spatially decimated by a factor of 4. In other words, spatial samples from each 2×2 local region of each intermediate frame are represented using a single pixel value (determined from pixels in and around a 2×2 local region of one of the input video frames. The result is a set of four ¼ resolution intermediate frames, denoted in FIG. 12 as $B_1(t_0)$ thru $B_1(t_3)$, where $t_1$ through $t_3$ denote timestamps or time indices, and the resolution index "1" of $B_1$ specifies the combination of temporal and spatial resolutions for this specific case. The intermediate frames are $B_1(t_0)=S(F_0, 2, 2)$, $B_1(t_1)=S(F_1, 2, 2)$, $B_1(t_2)=S(F_2, 2, 2)$, and $B_1(t_3)=S(F_3, 2, 2)$, where the arguments of the S(F, r, c) operator are as follows: F identifies the frame (or blend of frames) of the input video pulse which is spatially decimated, and F is spatially decimated by factors of r rows and c columns Decimation stage 43 generates the "120 fps" set ($B_2$) to include two intermediate frames, including by temporally decimating the input video pulse by a factor of two. In one implementation, temporal blending is done by simply averaging two input video frames per output frame. Alternatively, the method for combining pixels of input video frames could instead use a weighted average, filtered combination, or other method that combines multiple frames into one frame. The spatial decimation factor is also two. In one embodiment, stage 43 implements an anisotropic decimation method which spatially decimates only the rows of the intermediate frames, meaning the number of columns of each input video frames matches the number of columns of each frame in set $B_2$. As indicated in FIG. 13, the intermediate frames of set $B_2$ are: $B_2(t_0)=S((F_0+F_1)/2, 2, 1)$, and $B_2(t_2)=S((F_2+F_3)/2, 2, 1)$ Decimation stage 43 generates the "60 fps" set ($B_3$) to include one intermediate frame, by temporally decimating the input video by a factor of 4. This frame will typically include the greatest amount of motion blur for non-static input frames compared to the other frame sets. In one embodiment, the method for combining input video frames uses temporal averaging, but it could instead use a weighted average, filtered combination, or other method. Because the temporal decimation factor equals the pulse length, no spatial decimation is required in this case. As indicated in FIG. 14, the intermediate frame of set $B_3$ is $B_3(t_0)=(F_0+F_1+F_2+F_3)/4$.

Before the decision algorithm can make any resolution trade-off decisions, stage 47 must compute the cost of each resolution option (e.g., the cost of each set of $B_i$ in FIGS. 12-14), where the cost function models the loss in visual quality with respect to the input video.

In one implementation, the cost function is the sum of the absolute values of differences between pixel values of a pulse of the original video and pixel values of pulses synthesized from the intermediate frames "$B_i$" generated in decimation stage 43 of FIG. 11 (examples of the "pixel values" are provided below). The synthesized pulses (each comprising the same number of frames as does the input pulse) are generated (in stage 45 of FIG. 11) as follows. The synthesized pulse for the intermediate frame set for a given resolution index value i is generated by:

spatially interpolating (upsampling) each frame $B_i$ up to the original spatial resolution (e.g., using a Lanczos-2 filter, or another type of interpolating filter); and if the number of frames $B_i$ is smaller than the pulse length, repeating frames to fill in missing frames.

For example, to synthesize a pulse from frames $B_2(t_0)$ and $B_2(t_2)$ shown in FIG. 13, we first generate upsampled frames $B_2'(t_0)$ and $B_2'(t_2)$, the results of interpolating $B_2(t_0)$ and $B_2(t_2)$ up to 1920×1080 resolution, respectively. Then we create $B_2'(t_1)$ as a copy of $B_2'(t_0)$, and $B_2'(t_3)$ as a copy of $B_2'(t_2)$. In other words, because we started with only two frames (associated with time codes $t_0$ and $t_2$) we create the "missing" synthesized frames for time codes $t_1$ and $t_3$ by repeating the $t_0$ and $t_2$ synthesized frames.

For each resolution index value, once we have synthesized a pulse (pulse 46 of FIG. 11), stage 47 compute a difference pulse, a sample-by-sample absolute difference between the pixel values of the synthesized pulse and corresponding pixel values of the input video pulse 41. Then stage 47 averages the difference pulse over time within each half-pulse, and sums the result over space within each spatial region. The results are sets of cost values (cost maps 48 of FIG. 11), each cost map for a different one of the resolution indices, and each cost map consisting of one cost value for each spatial region in each half pulse of the input pulse 41.

The sets of cost values can optionally be refined using visual quality metrics which model the amount of perceived blur.

One implementation uses luma as the pixel value (of each pixel of each frame of the input pulse and the corresponding synthesized pulse) that is employed to generate the cost values. Luma is computed as a linear combination of the R, G, and B color components of each pixel of the input pulse and corresponding synthesized pulse. Other choices for the pixel value employed to generate the cost values include:

(1) a single color band (e.g., the pixel value is the green or "G" color component of each pixel of the relevant pulses);

(2) cost functions are computed for R, G, and B color components separately, using the same metric described above, and the three cost functions are then combined into a scalar cost function using an L1 norm, L2 norm, L-infinity norm, or other norm or method; and (3) the same as alternative (2) above, but also including local horizontal and vertical optic flow estimates.

The decision algorithm implemented in stage 49 chooses the lowest cost (for each spatial region in each half-pulse of the input pulse 41) across the resolution trade-off points (i.e., determines the resolution index i which results in the lowest cost value for the relevant spatial region of the relevant half-pulse). Optionally, before the cost values are fed to the decision algorithm, the cost values can be adjusted using a weighting scheme (e.g., that described in the next paragraph).

In a preferred embodiment, a parameter (resolution bias) controls the relative weighting between cost values, where the weight varies as a function of the resolution index, i, as follows:

$$W_i(b) = \begin{cases} i^b, & b \geq 0 \\ (i_{max} - i)^b, & b < 0 \end{cases}$$

where W is the weight for resolution index i, b is the bias parameter, and $i_{max}$ is the highest allowed value of the resolution index. The weights are global in the sense that their values are the same for all regions in all pulses. When b=0, no costs are modified. When b is set to a positive value, costs for higher spatial resolutions are penalized more, meaning selecting b>0 favors high temporal resolution. Similarly, negative values of b penalize higher temporal resolutions more, biasing costs to favor high spatial resolution.

After bias weighting is applied, the decision algorithm selects the resolution index associated with the lowest cost for each region within each half pulse. This (after an optional refinement step) determines a half-pulse map 50 associated with each half-pulse. Each of the two maps 50 contains "pixels" whose values are resolution index values, and each such value is associated with a spatial region within a half-pulse's spatiotemporal volume.

The half-pulse structure gives the decision algorithm finer temporal granularity when trading off spatial versus temporal resolution. The benefit is evident in cases where a region's motion content changes significantly mid-pulse or near mid-pulse. In the half pulse that contains more motion, the algorithm can select a higher temporal resolution to better capture a rapidly changing set of pixel values to reduce motion blur, while in the other half pulse the algorithm can select a higher spatial resolution to increase spatial sharpness.

Due to the sample rate constraint, the algorithm checks for the case where a region has a full spatial resolution ("full SR") in one half-pulse and a different (non-full SR) spatial resolution in the other half pulse. Choosing full SR for a region consumes the entire sample quota for the region for the entire pulse, so no further temporal updates to a full SR region can be allowed during the pulse. To enforce the sample quota, the algorithm compares the cost of choosing full SR for the entire pulse versus the average of the minimum cost of non-full SR resolutions in each half pulse:

$$C(i_{max}, t \in \lfloor \text{full pulse} \rfloor) < \frac{1}{2}\left[\min_{l=1,2,(i_{max}-1)} C(l, t \in [1^{st} 1/2\text{-pulse}]) + \min_{l=1,2,(i_{max}-1)} C(l, t \in [2^{nd} 1/2\text{-pulse}])\right].$$

When the above is true, it means the algorithm has determined that the full SR region (for the entire pulse) is a better quality representation than two representations (that have lower spatial resolutions) for the individual half-pulses. In this case, the index for the region in both half-pulse maps is set to $i_{max}$ to indicate "full SR" in the region for the entire pulse.

Each index map 50 may contain spatially adjacent index values that are very different; for example, one index may indicate full SR while its neighbor(s) indicates a low SR such as ¼ SR or ⅛ SR. Such "index discontinuities" arise, for example, when an object that is fairly uniform in luma moves across a textured background. When such a map is used in reconstruction, the resulting resolution discontinuities are visually objectionable and also create visually objectionable temporal artifacts.

To reduce the severity of such artifacts in the reconstructed video, preferred embodiments refine candidate half-pulse maps (to generate the half-pulse maps 50 that are output from stage 49) using one or more of the following operations: linear filtering, median filtering, quantization, and morphological operations. Smoothing can cause index values to shift such that at a given map location one half pulse map has a full SR index while the other half pulse map has a lower index. Accordingly, after smoothing, typical embodiments employ a smoothed, full SR index map for both half-pulses of the relevant pulse.

Figure 15:
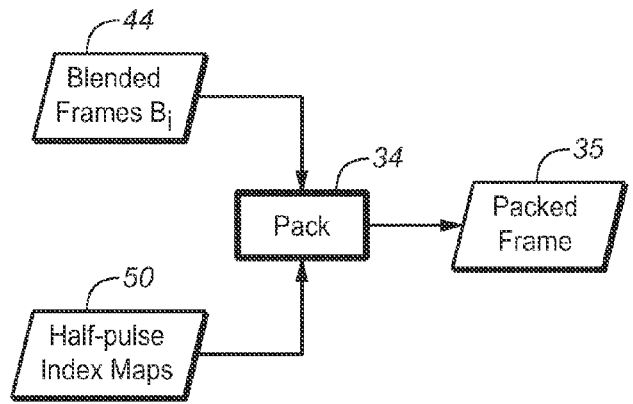
FIG. 15 is a diagram of an embodiment of packing stage 34 of FIG. 10, which operates in response to the output of the FIG. 11 embodiment of sample reduction stage 32 of FIG. 10.

After the final half-pulse maps 50 are generated, they are used with the blended frames 44 generated in response to the same input pulse, to produce each packed frame 35 (as indicated in FIG. 15). Each packed frame 35 is a sample-reduced representation of the input video pulse for storage and/or transport along certain paths in the video delivery pipeline.

The packing algorithm implemented by the FIG. 15 embodiment of packing stage 34 uses the final half-pulse maps 50 generated (in response to each input pulse) by the decision algorithm to copy samples from the intermediate (blended) frame sets $B_i$ that are generated (in stage 43 of FIG. 11) in response to the same input pulse into a single "packed" full resolution frame 35 that represents the input pulse. Each region of the packed frame 35 contains the same number of samples regardless of the map content.

Figure 16:
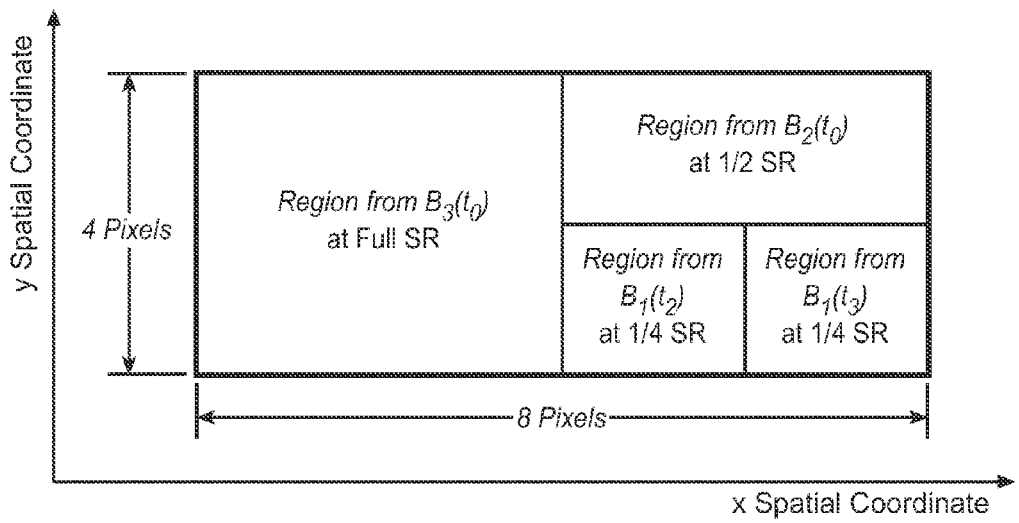
FIG. 16 is a diagram of a portion of a packed frame generated in accordance with an embodiment of the invention in response to a pulse (having a pulse length of four).

In one packing scheme, for each full spatial resolution (SR) region (identified by one of maps 50), the corresponding pixels of blended frame $B_3(t_0)$ are copied "as is" into the corresponding region of packed frame 35 (as shown in FIG. 16). For each half spatial resolution region (identified by maps 50 for both half-pulses), the packing algorithm copies the corresponding pixels of blended frame $B_2(t_0)$ and/or blended frame $B_2(t_2)$ into spatially adjacent locations in the packed frame 35 to form a single packed region. Similar packing rules preferably apply to blended frame data having other reduced spatial resolutions.

In the case that a region has a different index in each half-pulse map, packing is done slightly differently. For example, for a half-resolution region (identified by map 50 for the $1^{st}$ half pulse) and two quarter-resolution regions (identified by map 50 for the $2^{nd}$ half-pulse), the corresponding pixels of blended frame $B_2(t_0)$ can be placed spatially adjacent to the corresponding pixels of blended frames $B_1(t_2)$ and $B_1(t_3)$ to form a single region in the packed frame as shown in FIG. 16.

Figure 17:
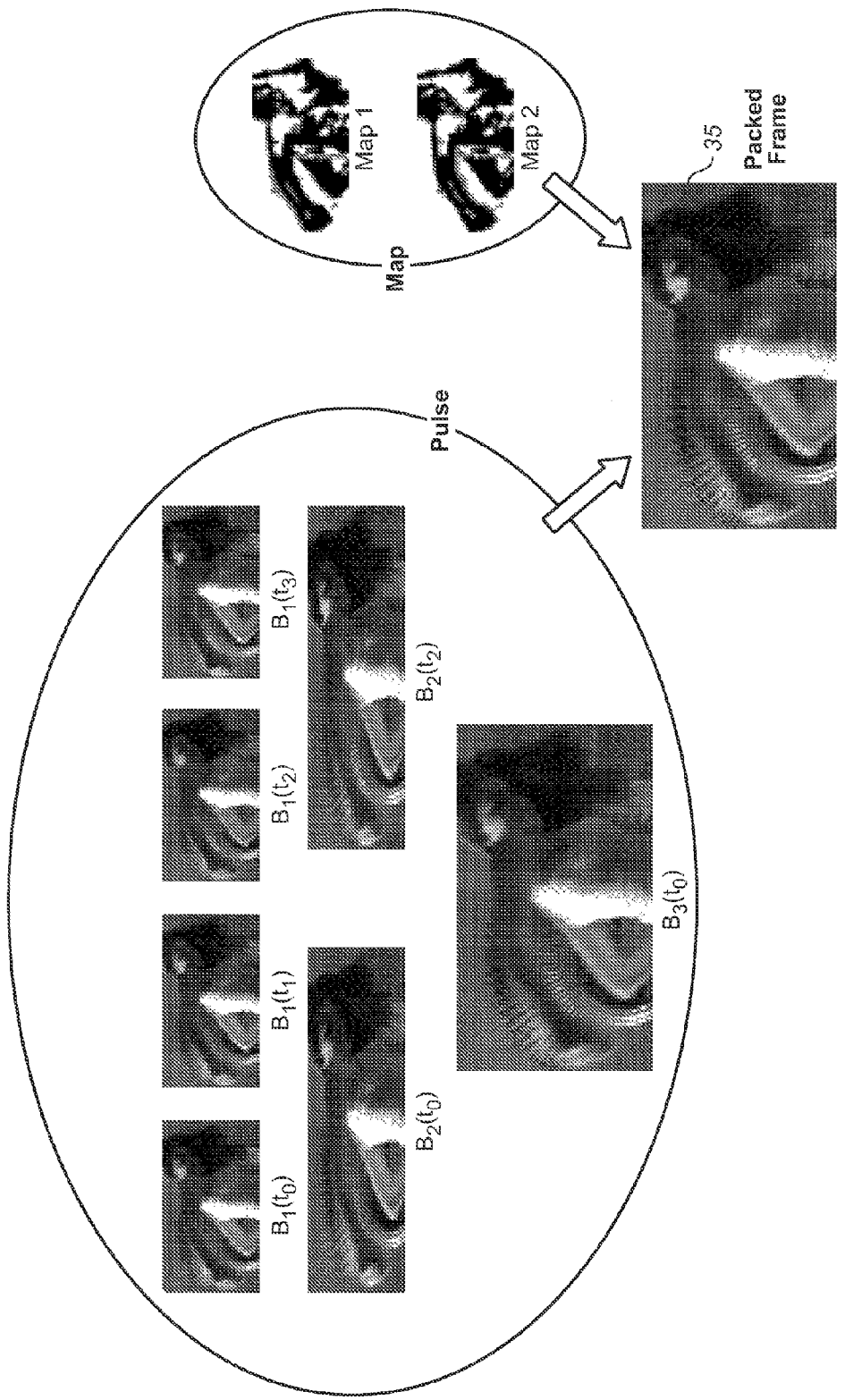
FIG. 17 shows the results of applying the frame packing process described in FIG. 15 to determine a packed frame from a compressed representation which comprises intermediate frames ($B_i$) and half-pulse resolution index maps. The compressed representation can be considered to be a synthesized (decimated) pulse, and the packing process generates a packed frame by copying samples from the synthesized pulse as directed by the resolution index maps for each half pulse.
Figure 19:
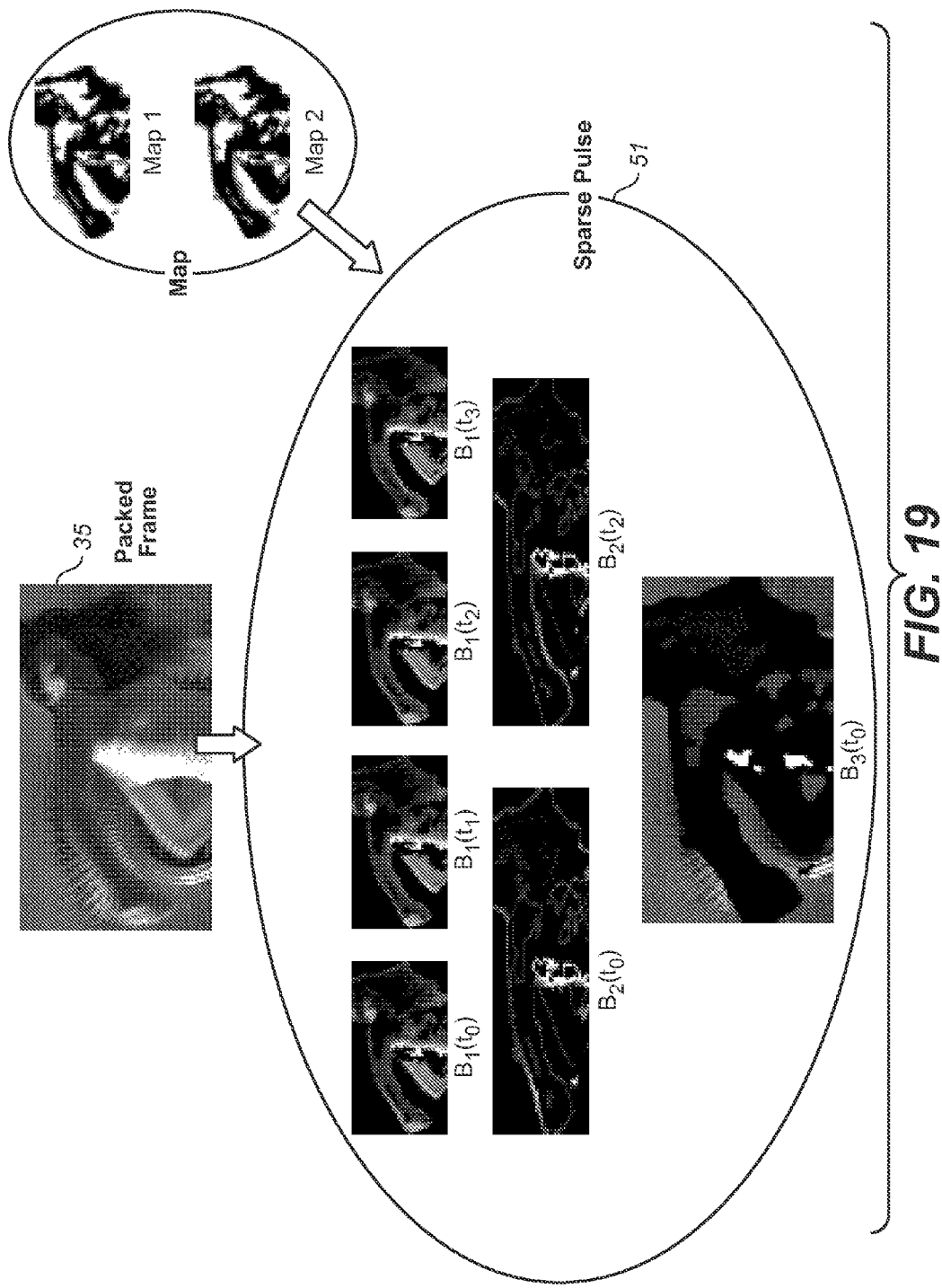
FIG. 19 shows the results of applying stage 51 of the reconstruction process of FIG. 18 to determine a sparse pulse data block which consists of "patches" of samples of the intermediate frames $B_i$ that are heterogeneous in spatial and temporal resolution.

FIG. 17 shows the results of applying the frame packing process described with reference to FIG. 15 to determine a packed frame from a compressed representation (of an input video pulse) which comprises intermediate frames ($B_i$) and two half-pulse resolution index maps. The compressed representation can be considered to be a synthesized (decimated) pulse, and the packing process generates a packed frame by copying samples from the synthesized pulse as directed by the resolution index maps for each half pulse.

Figure 18:
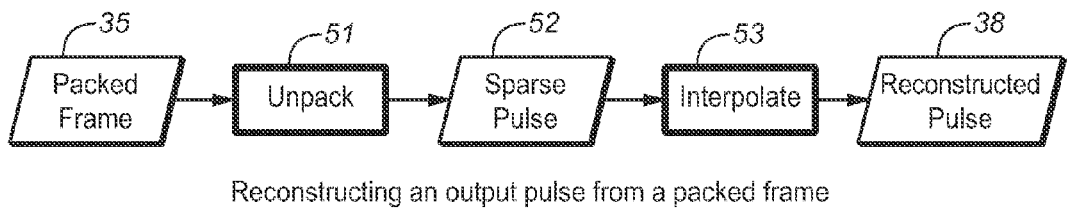
FIG. 18 is a diagram of processing steps and data flow implemented in an embodiment of reconstruction stage 37 of FIG. 10.

FIG. 18 is a diagram of processing steps and data flow implemented in an embodiment of reconstruction stage 37 of FIG. 10. Reconstruction generates a full resolution pulse 38 in response to a single packed frame 35.

First, the packed frame is unpacked (in stage 51 of FIG. 18). Conceptually, we unpack each region by copying its samples into a pulse workspace, a memory buffer large enough to hold $L_{pulse}$ full resolution frames (where $L_{pulse}$ is the pulse length). At this point, the pulse workspace holds a set of samples 52. The samples 52 are a sparse pulse data block which consists of "patches" of samples that are heterogeneous in spatial and temporal resolution (as in the exemplary sparse pulse data block 52 shown in FIG. 19).

Half-pulse resolution index maps 50 are used to determine where to copy samples 52 from a packed frame into the correct regions of the sparse pulse workspace.

Interpolation (implemented by stage 53 of FIG. 18 in response to resolution index maps 50) is needed to reconstruct a full-resolution pulse 38 from the sparse pulse 52. Temporal interpolation is done by repeating samples of pulse 52, while spatial interpolation is done using an iterative resolution refinement method (the "bottom-up" resolution refinement method described below).

An example of temporal interpolation is to copy the relevant pixels of intermediate frame $B_3(t_0)$ (described with reference to FIG. 14) to a region in frame 0 of the pulse workspace, and then to copy the same pixels to the corresponding spatial location in each of frames 1, 2, and 3 of the workspace, because $B_3(t_0)$ is a full spatial resolution region that does not change during the reconstructed pulse. In the example, the relevant pixels of intermediate frame $B_2(t_0)$ are copied to a corresponding spatial location in frame 0, and then copied in the corresponding spatial location in frame 1 since they are constant during the first half pulse. The relevant pixels of intermediate frames $B_1(t_2)$ and $B_1(t_3)$ are copied to corresponding spatial locations in frames 2 and 3, respectively, and neither of these pixels needs to be further copied since they have already been updated at the full frame rate. This process is applied to all regions in the packed frame.

After temporal interpolation, regions that are not already at full spatial resolution need to be spatially interpolated to yield complete frames. This spatial interpolation process is described next.

Each frame is interpolated using an iterative procedure that starts with the lowest spatial resolution regions and ends with the highest spatial resolution regions. In each iteration, the lowest resolution regions are interpolated to the next higher resolution using an interpolation filter. Regions that are already at the target resolution or higher are not modified during the iteration. A block that is interpolated in one iteration is processed again on the next iteration. This allows the higher resolution blocks to influence the reconstruction of lower resolution blocks during each iteration, so low resolution blocks are progressively refined.

After resolution refinement, block artifacts can still be present in a frame. The reconstruction algorithm optionally applies block artifact metrics and de-blocking filters to reduce blockiness. De-blocking is implemented (if at all) during interpolation stage 53 of FIG. 18.

We next describe alternative ways to provide the metadata needed to implement reconstruction of full resolution video in accordance with the invention. As explained above, it is necessary to include with or in the compressed representation (of input video generated in accordance with the invention) metadata indicating what temporal update rate has been assigned to each spatial region. This can be done in a straightforward way by sending several bits for each region (e.g., in an index map). Often, though, it is better to reduce the amount of such metadata.

One way to reduce the amount of metadata is to cap the number of transitions (in the bitstream indicative of the metadata) and use lossless compression to achieve a constant, low data rate. This works well because there is an inherent consistency in maps related to naturally occurring scenes. Video with high map complexity typically implies motion not perceivable to the human visual system. High map complexity corresponds to more chaotic motion and flickering regions that are difficult for the visual system to smoothly track with SPEMs.

Yet another method is to embed temporal update rate transition signals in a compressed representation by designating certain pixel values as transition codes. Pixels with such values would not be allowed for actual pixel data, and a pixel that happened to be at a transition point would be used not as image data, but as a map signal. This has the advantage of maintaining exactly the capped data rate. There is a slight but bearable cost in terms of reduced image data capacity (again, maps don't transition so often that a problem would arise).

In a video system whose maximum data rate is too low to support "raw" packed frames and uncompressed rate transition maps generated in accordance with the invention, the packed frames and/or maps can compressed. If the compression codec is lossy, the packed frames and maps typically need to be pre-processed to mitigate the effects of data loss caused by the lossy codec. The goal of such pre-processing is to reduce the amount of quality loss in the output video that is displayed (following reconstruction).

One source of visually objectionable artifacts in the output video is a mismatch between one or more values in a packed frame and its associated map. Lossy compression creates errors in both data sets, and when an error causes a mismatch, the result can be quite visible. For example, given a particular region with a map value that indicates maximum spatial resolution, and an associated set of maximum spatial resolution set of pixel values in the packed frame, if the map value is changed by a lossy codec to a value that indicates minimum spatial resolution but maximum update rate, the reconstruction algorithm would generate badly errored output samples because it would apply spatial upsampling to individual pixel values of the full-resolution region and render them as a time sequence, which is very different from rendering the full-resolution region once and leaving it static for the entire pulse.

The key to avoiding such mismatches between packed frames and resolution maps is to enforce matching on the server side (i.e., at the point where the packed frames and resolution maps are generated) before sending packed frames and resolution maps to a client (for reconstruction of video to be displayed). The server can generate an initial resolution map, then compress it (introducing the same errors that a client would see upon decompression of the transmitted compressed map), decompress it, then use the "corrupted" resolution map to select samples to put in the packed frame. This way the packed frame's samples will match the uncompressed map exactly on the client side.

To mitigate the effects of data loss caused by lossy compression, packed frames and maps can be pre-processed before lossy compression. Data loss will generally still cause some data corruption even on pre-processing data, so post-processing done on decompressed data can compensate for compression-induced artifacts. The design of pre- and post-processing methods can be guided by knowledge of the types of artifacts likely to occur, and can be optimized for each specific codec.

In motion based codecs, the mechanism can look similar to or be combined with motion vector signaling.

While it is possible to simply encode packed frames directly using a codec (e.g., an H.264 encoder), this direct method will typically work well only for high bit rates like those seen on disc systems (e.g. Blu-ray). For delivery over broadcast, cable or IP, a packed frame encoded as a B frame may lack sufficient information to provide smooth motion reconstruction. In this case, it would be better to use extensions (e.g., SVC) to scalably transmit some of the packed data in a controlled manner. Thus, rather than employing the brute force method of sending a higher frame rate, a scalable method would be used to gracefully augment a base layer (e.g., one generated in a conventional manner from input video) with "motion blur aware" enhancement data generated in accordance with the invention.

As described, a sequence of packed frames (and corresponding metadata) is one way to implement a compressed representation of input video in accordance with the invention. Alternatively, the input video, packed frames, and metadata can be used to generate a representation composed of a base layer together with an enhancement layer which can be delivered. The enhancement layer itself may consist of a hierarchy of sub-layers to allow for scalability.

The base layer can be a sequence of frames that is "self contained" in the sense that it can be displayed as a video at the base rate. If a base layer has a frame rate that is low enough (the base layer's frame rate is analogous to the pulse rate of the packed frame representation), e.g., 30 fps, it can be played back on a legacy system. In this case the enhancement layer(s) should be presented to the legacy system in such a way (e.g., as metadata) that the legacy system ignores the enhancement layer(s) and plays back (displays) only the base layer.

The base layer can be derived from the input video by decimating the input video, with the amount and type of motion blur controlled by the blending (decimation) method. For example, if the decimation method employs a temporal filter, the filter can be designed to synthesize motion blur due to a small shutter angle (e.g., by using a unit impulse as the filter) or a large shutter angle (e.g., by using a long box filter) or any shutter angle in between. Other ways of blending are possible, including, but not limited to, weighted averaging, Lanczos filtering, other linear filters, non-linear filters, and non-linear operations.

Also, motion blur in individual input frames can be reduced or removed through the use of temporal sharpening filters and other motion deblurring methods.

The pixels of the enhancement layer may simply be arithmetic differences between pixels of the base layer and packed frames generated from the input video in accordance with the invention (i.e., each frame of the enhancement layer can consist of difference values indicative of differences between pixels of frames of the base layer and a corresponding one of the packed frames).

The enhancement layer can be used to improve the quality of the reconstructed output video by providing a higher update rate for areas that exhibit a higher rate of change, resulting in higher temporal fidelity. In one exemplary embodiment, data from the enhancement layer is used to enhance the base layer using one or more of the following methods during reconstruction of the output video:

Substitution: The algorithm overwrites base layer data in specific local spatiotemporal regions with enhancement layer data. In this method, base layer data is essentially discarded; and Repair: The algorithm applies enhancement layer data as a residual or other modifying effect on base layer data in specific local spatiotemporal regions. The base layer is partially retained.

Any combination of substitution and repair methods can be applied on a per-region basis as well.

The inventive compression method is compatible with a user selected shutter angle and user controllable aesthetic. With current low frame rates of 24-60 fps, cinematographers must be very careful to limit the speed of motion in their shots so that the illusion of motion is almost always maintained. Because of viewers' familiarity with the low frame rate of cinema, some forms of motion blur are associated with dramatic content and there has arisen the notion of a "film look" which is considered important to preserve for both artistic and commercial reasons.

Moreover, shutter angle selection can be used to artistic effect. Shutter angle is the proportion of each frame time that the photo sensor is permitted to gather light. It is expressed as an angle because mechanical shutters can be realized as a spinning disc with some angle left clear and the remaining portion opaque. As mentioned, sometimes a short shutter angle is used despite the resulting stroboscopic effect because of the feeling that it evokes in viewers. In the context of digital cameras, terms such as "shutter duty cycle" or "shutter exposure fraction" may be used instead. Although the present specification uses the expression "shutter angle," the invention has applications that include both digital and film technologies.

The inventive method can support the maintenance of the film look yet allow for a relaxation of speed limitations. This is done by biasing the selection algorithm (during compression in accordance with the invention) so that it will choose lower temporal update rates for regions until they would break a predetermined threshold. By setting this to match the cinematographer's handbook, the film look will be preserved even while permitting motion that exceeds traditionally allowable speeds.

Similarly for shutter angle, the user can control the conversion algorithm so that the synthetic motion blur is set according to desired shutter. Each region's update rate selection can be biased to permit just the desired amount of strobing, despite permitting greater speed of pans and objects.

Since the conversion algorithm and reconstruction algorithm are defined together, it is possible to organize samples at the conversion side in increasingly sophisticated ways if the reconstruction side can permit the additional computation. One such method is to organize the samples (of the inventive compressed representation of input video) so that they can be reconstructed via super-resolution. More specifically, it is well known that a sequence of images of the same scene taken from very slightly different positions can be used to create an image with higher resolution than any of the individual frames.

Since the input video to be compressed typically has high spatial resolution to begin with, we can perturb the samples that included in the inventive compressed representation (of the input video) in a synthetic manner so that reconstruction of the original video (or a close approximation thereto) is possible using super-resolution methods.

For example, suppose we have 120 fps original rate and a 30 fps base rate so that the pulse length is 4. Now consider a region with enough motion to warrant the 120 fps rate but with ¼ the spatial resolution. In the pulse, that region will be sent four times. We need not send a sample from exactly the same position in that region all four times. We can perturb each one slightly but in a known fashion using the additional data in our full resolution originals to set the values. The reconstruction algorithm can then use standard super-resolution to recover noticeably more information than would otherwise be the case.

We have mentioned the use of compression (in accordance with the invention) at the time of capture/production of the input video, and reconstruction (in accordance with the invention) at the time of display. We have also noted how the compression and reconstruction can be used in conjunction with or within a codec framework.

Alternatively, both ends of the inventive method (compression and reconstruction) can be used during a post-production flow. Many facilities which perform post-production services on video or cinematic image sequences do so using cabled connections like HD-SDI which are similar to standards like HDMI. The inventive method can be used to send higher frame rate content over such links even when the data is used without displaying locally.

Furthermore, at the consumer end, reconstruction might take place in a set top box and the result shipped over HDMI, or reconstruction might take place as one of the final steps within the TV itself. In each case, this has the advantage of reducing the required capacity of the connection from one component to another, be it a cable between boxes or a bus between chips.

In short, compression (conversion) in accordance with the invention can be included with pre-processing inside a camera, or performed on content at the front of a post-production or broadcast chain, or at the end of said chain. It can be used prior to or in conjunction with a compression engine similar to H.264 or JPEG 2000 and it thus suitable to provide advantage in the delivery of content to cinema exhibition halls as well as to homes equipped with set top boxes, TV tuners, cable set top boxes or internet connections. Within the home, improved display is facilitated by enabling high frame rate panels to receive content matched to their capabilities (in comparison to today's situation when said panels typically have circuits that do a poor job of upconverting temporal rates).

The inclusion of multiple update rates in packed frames makes embodiments of the inventive method ideal for enabling adaptive streaming. When delivering content over the internet it is often the case that network conditions change and a virtual connection that was fast becomes slow or vice versa. It is common practice to match video quality to delivery conditions on the fly and this is known as adaptive streaming. It is commonly experienced during playback sessions with services like Netflix, when the video may pause and a message may indicate that the bit rate is being adjusted as needed.

Embodiments of the invention can provide on-the-fly encoders with a highly pre-processed base from which to start. That is, the temporal information can be sent as packed by the conversion algorithm when network conditions are ideal, or can be unpacked and blended to provide a lower frame rate, all the way down to the base rate, by the server, then sent to the client. Blending reduces the number of samples, hence providing a lower frame rate. By having the conversion step done ahead of time, the encoding and the switching between frame rates to adapt to fluctuating network conditions can be much more efficient.

Embodiments of the invention can also be used to implement trick modes. Trick modes are functions provided to a user watching a network video stream that let the user control a video's playback, similar to the way a (local) DVD player is controlled. Functions include pause, jump to an earlier or later frame in the video, slow/normal/fast forward, slow/normal/fast rewind, step a single frame forward/backward, and so on.

When the user changes modes, the server must adapt to a new mode, and advantages offered by the invention in adaptive streaming also provide the encoder more efficiency in adapting to new trick modes.

For example, if the user chooses to jump to a new temporal location in the video, any cached frames on the client becomes invalidated; to minimize the delay in resuming video playback after the jump, and to build up a new frame cache as quickly as possible on the client, the server would initially send a lower data rate stream.

For another example, suppose a server using an embodiment of the inventive method contains a 120 fps video with packed frames with a base rate of 30 fps, and let the server have a legacy client limited to a maximum video rendering rate of 30 fps. During normal playback, the server only needs to send a 30 fps base layer, but during ¼ speed slow rewind and ¼ speed slow forward trick modes, the server sends the 120 fps version of the video stream, but sends encoded frames at ¼ bit rate (i.e., ¼ of the bit rate required to send the video to a 120 fps-capable client watching the video at normal speed). Thus the legacy client still receives a 30 fps stream and the user experiences a ¼ speed video that has smooth motion, as opposed to a 7.5 fps video that, without our method, would be displayed to the end user.

To use embodiments of the invention in conjunction with a codec that generates intra-coded frames interleaved with inter-coded frames, the pulse length and the spacing (in units of frames) of intra-coded frames can be chosen such that one is an integer multiple of the other.

When a video is represented as a base layer combined with an enhancement layer, any time the client cache runs low or is invalidated due to non-ideal network conditions or a change in trick mode, the encoder can send just the base layer or reduced data rate version of the base layer, then as conditions improve, enhancement layer data can "catch up" and provide better quality output video and a larger set of cached frames to provide more robustness.

If conditions are non-ideal in the longer term, the system can adaptively adjust how much bandwidth and client-side frame cache to allocate for base layer data versus enhancement layer data. Base layer data may be sent and cached further ahead (or behind, if the trick mode is a rewind mode or a jump backwards) to provide more playback robustness, while enhancement layer data is sent as conditions permit at a lower priority.

Other aspects of the invention are a processor configured to perform any embodiment of the inventive compression and/or reconstruction method, an encoder configured to perform any embodiment of the inventive compression method, a video reconstruction system configured to perform any embodiment of the inventive reconstruction method, a system including such a processor and one or more of a capture subsystem for generating input video (to be compressed in accordance with the invention), a delivery subsystem configured to store and/or transmit a compressed representation (e.g., packed frames) of input video generated in accordance with the invention, and a display subsystem for displaying output video generated by reconstructing compressed video in accordance with the invention. For example, a system configured to perform the FIG. 10 embodiment includes a camera (or other video source) configured to implement capture operation 30, a processor configured to perform compression (including method stages 32 and 34) on the output of the video source, a delivery subsystem implementing delivery stage 36, a second processor (e.g., implemented in a set top box) configured to perform reconstruction (method stage 37) on compressed video data received from the delivery subsystem, and display device 39 coupled and configured to display reconstructed frames output from the second processor.

Optionally, the delivery subsystem includes an encoder coupled and configured to further encode (e.g., compress) a compressed representation of input video (which has been generated in accordance with the invention) for storage and/or transmission, and a decoder coupled and configured to decode (e.g., decompress) the encoded output of the encoder to recover the compressed representation of input video.

Embodiments of the inventive processor, encoder, and video reconstruction system, are (or include) a general or special purpose processor (e.g., a digital signal processor or microprocessor implemented as an integrated circuit (chip) or chip set) which is programmed with software (or firmware) and/or otherwise configured to perform an embodiment of the inventive method. For example, stages 32 and 34 of the FIG. 10 embodiment, stages 40, 43, 45, 47, and 49 of the FIG. 11 embodiment, or stage 34 of the FIG. 15 embodiment can be implemented as such a processor (or encoder), and stage 37 of the FIG. 10 embodiment or stages 51 and 53 of the FIG. 18 embodiment can be implemented as any such processor (or video reconstruction system). Another aspect of the invention is a computer readable medium (e.g., a disc) which stores code for implementing any embodiment of the inventive method.

The present invention may suitably comprise, consist of, or consist essentially of, any of the steps and elements (the various parts and features of the invention) and their equivalents as described herein. Some embodiments of the present invention illustratively disclosed herein are practiced in the absence of one or more of the steps and elements described herein, whether or not this is specifically disclosed herein. Numerous modifications and variations of the present invention are possible in light of the above teachings. It is therefore to be understood that within the scope of the appended claims, the invention may be practiced otherwise than as specifically described herein.

What is claimed is:

1. A video compression method for generating a compressed representation of input video, including the steps of:
    (a) temporally partitioning the input video into pulses, each of the pulses comprising at least two frames of the input video, and for each region of a spatial partition of a frame of each of the pulses, generating at least two different candidate blended pixel sets, at least one of the candidate blended pixel sets including at least one of a temporally blended pixel determined from at least two frames of the input video and a temporally and spatially blended pixel determined from at least two frames of the input video; and
    (b) for said each region of the spatial partition for each of the pulses, selecting one of the candidate blended pixel sets for inclusion in the compressed representation.

2. The method of claim 1, wherein step (b) includes a step of assessing quality of reconstructed video determined from the candidate blended pixel sets.

3. The method of claim 1, wherein said method generates the compressed representation of the input video so as to optimize perceived video quality of reconstructed video determined from said compressed representation.

4. The method of claim 1, wherein the candidate blended pixel sets include a first set including spatially blended pixels of the input video, and a second set including temporally and spatially blended pixels determined from different frames of the input video.

5. The method of claim 4, wherein the candidate blended pixel sets also include a third set which includes temporally blended pixels determined from different frames of the input video.

6. The method of claim 1, wherein step (a) determines the pulses of the input video such that each of the pulses comprises S frames of the input video, and step (a) includes a step of determining multiple spatiotemporally decimated partitions of each of the pulses such that each of the spatiotemporally decimated partitions is a set of intermediate frames comprising decimated pixels, each of the decimated pixels for each of the intermediate frames corresponding to a different region of the spatial partition for said each of the pulses.

7. The method of claim 6, wherein each of the intermediate frames for the ith spatiotemporally decimated partition comprises Mi decimated pixels derived from one or more of the frames of said each of the pulses, where Mi is an integer, i is an index identifying the ith spatiotemporally decimated partition, and the index i is different for each of the spatiotemporally decimated partitions of said each of the pulses, each of the intermediate frames of one of the spatiotemporally decimated partitions of said each of the pulses has the same spatial resolution, and the intermediate frames of different ones of the spatiotemporally decimated partitions of said each of the pulses have different spatial resolutions.

8. The method of claim 6, wherein step (b) includes a step of generating a cost map for each of the pulses of the input video in response to said each of the pulses of the input video and reconstructed video frames generated from the intermediate frames determined from said each of the pulses of the input video.

9. The method of claim 1, wherein step (a) determines the pulses of the input video such that each of the pulses comprises S frames of the input video and each of the pulses comprises fractional pulses, and step (a) includes a step of determining multiple spatiotemporally decimated partitions of each of the fractional pulses such that each of the spatiotemporally decimated partitions is a set of intermediate frames comprising decimated pixels, each of the decimated pixels for each of the intermediate frames corresponding to a different region of the spatial partition for said each of the fractional pulses.

10. The method of claim 9, wherein each of the intermediate frames for the ith spatiotemporally decimated partition comprises Mi decimated pixels derived from one or more of the frames of said each of the fractional pulses, where Mi is an integer, i is an index identifying the ith spatiotemporally decimated partition, and the index i is different for each of the spatiotemporally decimated partitions of said each of the fractional pulses, each of the intermediate frames of one of the spatiotemporally decimated partitions of said each of the fractional pulses has the same spatial resolution, and the intermediate frames of different ones of the spatiotemporally decimated partitions of said each of the fractional pulses have different spatial resolutions.

11. The method of claim 9, wherein step (b) includes a step of generating a cost map for each of the fractional pulses in response to said each of the pulses of the input video and reconstructed video frames generated from the intermediate frames determined from said each of the pulses of the input video.

12. The method of claim 1, also including a step of generating metadata indicative of at least one reconstruction parameter for said each region of the spatial partition of said each of the pulses.

13. The method of claim 12, wherein the reconstruction parameter is an update rate for said each region of the spatial partition of said each of the pulses.

14. The method of claim 12, also including a step of outputting the metadata with the compressed representation.

15. The method of claim 12, also including a step of including the metadata in the compressed representation.

16. The method of claim 12, wherein the metadata comprises at least one resolution index map, and the step of generating the metadata includes a step of generating at least one candidate resolution index map and filtering each said candidate resolution index map to generate the at least one resolution index map.

17. The method of claim 12, wherein the metadata is indicative of at least one video attribute other than spatial resolution and temporal resolution, and at least one resolution index value, for said each region of the spatial partition of each of the packed frames.

18. The method of claim 1, also including the step of:
(c) packing the candidate blended pixel sets selected in step (b) into packed frames, whereby a packed frame generated for each of the pulses of the input video is the compressed representation of said each of the pulses of the input video.

19. The method of claim 18, also including a step of generating metadata indicative of at least one reconstruction parameter for each region of a spatial partition of each of the packed frames, and outputting the metadata with the compressed representation.

20. The method of claim 18, also including a step of generating metadata indicative of at least one reconstruction parameter for each region of a spatial partition of each of the packed frames, and including the metadata in the compressed representation.

21. The method of claim 19, wherein the reconstruction parameter is an update rate for said each region of the spatial partition of said each of the packed frames.

22. The method of claim 18, also including a step of:
(d) generating reconstructed video frames in response to the packed frames.

23. The method of claim 18, wherein each pixel of the input video has m×n resolution, the input video has a frame rate of k frames per second, where m, n, and k are integers, the compressed representation has a pixel rate less than m×n×k pixels per second, and the method includes a step of outputting the packed frames at a base rate which is less than k packed frames per second.

24. The method of claim 23, wherein the base rate is k/4 packed frames per second, and wherein step (a) includes steps of:
determining the pulses of the input video such that each of the pulses comprises four frames of the input video; and
determining multiple spatiotemporally decimated partitions of each of the pulses such that each of the spatiotemporally decimated partitions is a set of intermediate frames comprising decimated pixels, including by determining a first set of intermediate frames including four intermediate frames each comprising ¼(m×n) spatially decimated pixels, a second set of intermediate frames including two intermediate frames each comprising ½(m×n) decimated pixels, and a third set of intermediate frames comprising a single intermediate frame comprising m×n temporally decimated pixels.

25. The method of claim 1, also including a step of generating a layered representation of the input video and the compressed representation, said layered representation comprising a base layer and an enhancement layer.

26. The method of claim 1, wherein reconstructed video determined from the compressed representation has a set of visual characteristics, and the candidate blended pixel sets are generated to achieve at least one desired visual characteristic of said reconstructed video.

27. The method of claim 26, wherein the at least one desired visual characteristic of said reconstructed video is a shutter angle characteristic.

28. A video compression method for generating a compressed representation of input video, the compressed representation having less data than the input video, the method including the steps of:
grouping the input video into groups of temporally consecutive frames, each of the groups of frames comprising at least two frames of the input video;
partitioning each frame of the input video into a plurality of regions;
generating at least two different candidate blended pixel sets for each region of each frame, at least one of the candidate blended pixel sets including at least one of a temporally blended pixel determined from at least two frames of the input video and a temporally and spatially blended pixel determined from at least two frames of the input video; and
selecting one of the candidate blended pixel sets for inclusion in the compressed representation for each region of each frame.

29. A non-transitory computer-readable medium having code embodied therein for causing an electronic device to perform a video compression method for generating a compressed representation of input video, the compressed representation having less data than the input video, the method including the steps of:
grouping the input video into groups of temporally consecutive frames, each of the groups of frames comprising at least two frames of the input video;
partitioning each frame of the input video into a plurality of regions;
generating at least two different candidate blended pixel sets for each region of each frame, at least one of the candidate blended pixel sets including at least one of a temporally blended pixel determined from at least two frames of the input video and a temporally and spatially blended pixel determined from at least two frames of the input video; and
selecting one of the candidate blended pixel sets for inclusion in the compressed representation for each region of each frame.

* * * * *